(12) United States Patent
Fullerton

(10) Patent No.: US 7,539,237 B2
(45) Date of Patent: *May 26, 2009

(54) FAST LOCKING MECHANISM FOR CHANNELIZED ULTRAWIDE-BAND COMMUNICATIONS

(75) Inventor: Larry W. Fullerton, Huntsville, AL (US)

(73) Assignee: Alereon, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/586,066

(22) Filed: Oct. 25, 2006

(65) Prior Publication Data

US 2007/0153873 A1   Jul. 5, 2007

Related U.S. Application Data

(63) Continuation of application No. 10/411,090, filed on Apr. 11, 2003, now Pat. No. 7,231,611, which is a continuation of application No. 09/158,570, filed on Sep. 22, 1998, now abandoned, which is a continuation of application No. 08/761,602, filed on Dec. 6, 1996, now Pat. No. 5,832,035.

(51) Int. Cl.
    *H04K 1/00* (2006.01)
(52) U.S. Cl. .................. 375/149; 375/150; 375/355
(58) Field of Classification Search ................. 375/150, 375/208, 210, 219, 327, 355, 367, 371, 255, 375/149

See application file for complete search history.

(56) References Cited

U.S. PATENT DOCUMENTS 3,593,138 A    7/1971  Dunn et al.
3,659,203 A    4/1972  Ross et al.
3,662,316 A    5/1972  Robbins (Continued)

FOREIGN PATENT DOCUMENTS

DE    2816353 A1    10/1979

(Continued)

OTHER PUBLICATIONS

Astantin et al. Principles of Superwideband Radar Measurements, Radio Isvyaz, Moscow, 1989, pp. 104 and 108-109.

(Continued)

*Primary Examiner*—Temesghen Ghebretinsae
(74) *Attorney, Agent, or Firm*—Sprinkle IP Law Group

(57) ABSTRACT

A receiver for acquisition and lock of an impulse radio signal comprising an adjustable time base to output a sliding periodic timing signal having an adjustable repetition rate, and a decode timing modulator to output a decode signal in response to the periodic timing signal. The impulse radio signal is cross correlated with the decode signal to output a baseband signal. The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by a one or more extra counts after each T pulses is reached in order to shift the PN code modulo for proper phase alignment of the periodic timing signal and the received impulse radio signal.

7 Claims, 16 Drawing Sheets

U.S. PATENT DOCUMENTS

| | | | |
|---|---|---|---|
| 3,686,669 A | 8/1972 | Toulis | |
| 3,720,950 A | 3/1973 | Vehrs, Jr. | |
| 3,721,912 A | 3/1973 | Ross | |
| 3,728,632 A | 4/1973 | Ross | |
| 3,737,776 A | 6/1973 | Fletcher et al. | |
| 3,739,392 A | 6/1973 | Ross et al. | |
| 3,750,025 A | 7/1973 | Ross | |
| 3,757,290 A | 9/1973 | Ross et al. | |
| 3,772,697 A | 11/1973 | Ross | |
| 3,794,996 A | 2/1974 | Robbins et al. | |
| 3,864,635 A | 2/1975 | Ewanus | |
| 3,866,230 A | 2/1975 | Tewksbury | |
| 4,122,393 A | 10/1978 | Gordy et al. | |
| 4,150,375 A | 4/1979 | Ross et al. | |
| 4,279,018 A | 7/1981 | Frosch et al. | |
| 4,291,409 A | 9/1981 | Weinberg et al. | |
| 4,361,890 A | 11/1982 | Green, Jr. et al. | |
| 4,423,517 A | 12/1983 | Danno et al. | |
| 4,545,061 A | 10/1985 | Hileman | |
| 4,550,414 A | 10/1985 | Guinon et al. | |
| 4,641,317 A | 2/1987 | Fullerton et al. | |
| 4,665,404 A | 5/1987 | Christy et al. | |
| 4,688,232 A | 8/1987 | Fox | |
| 4,695,752 A | 9/1987 | Ross et al. | |
| 4,743,906 A | 5/1988 | Fullerton | |
| 4,803,726 A | 2/1989 | Levine et al. | |
| 4,813,057 A | 3/1989 | Fullerton | |
| 4,937,580 A | 6/1990 | Wills | |
| 4,979,186 A | 12/1990 | Fullerton | |
| 4,984,247 A | 1/1991 | Kaufmann et al. | |
| 5,008,899 A | 4/1991 | Yamamoto | |
| 5,018,165 A | 5/1991 | Sohner et al. | |
| 5,031,191 A | 7/1991 | Hiramatsu et al. | |
| 5,099,495 A | 3/1992 | Mikoshiba et al. | |
| 5,105,437 A | 4/1992 | Kingston et al. | |
| 5,111,451 A | 5/1992 | Piasecki et al. | |
| 5,128,961 A | 7/1992 | Ueda et al. | |
| 5,140,610 A | 8/1992 | Holliday et al. | |
| 5,148,174 A | 9/1992 | Harmuth | |
| 5,173,923 A | 12/1992 | Crespo et al. | |
| 5,177,768 A | 1/1993 | Crespo et al. | |
| 5,214,669 A | 5/1993 | Zarembowitch | |
| 5,222,103 A | 6/1993 | Gross | |
| 5,268,926 A | 12/1993 | Sebilet | |
| 5,317,441 A | 5/1994 | Sidman | |
| 5,329,558 A | 7/1994 | Larsson et al. | |
| 5,337,054 A | 8/1994 | Ross et al. | |
| 5,363,108 A | 11/1994 | Fullerton | |
| 5,400,359 A | 3/1995 | Hikoso et al. | |
| 5,404,355 A | 4/1995 | Raith | |
| 5,442,646 A | 8/1995 | Chadwick et al. | |
| 5,469,470 A | 11/1995 | Takahashi | |
| 5,623,487 A | 4/1997 | Natali | |
| 5,677,927 A | 10/1997 | Fulleron et al. | |
| 5,687,169 A | 11/1997 | Fullerton | |
| 5,717,713 A | 2/1998 | Natali | |
| 5,745,525 A | 4/1998 | Hunsinger et al. | |
| 5,798,729 A | 8/1998 | Scholz | |
| 5,832,035 A * | 11/1998 | Fullerton | 375/149 |
| 6,097,788 A | 8/2000 | Berenstein et al. | |
| 6,959,031 B2 * | 10/2005 | Haynes et al. | 375/130 |
| 2001/0040883 A1 | 11/2001 | Chang et al. | |

FOREIGN PATENT DOCUMENTS

| | | |
|---|---|---|
| DE | 3131186 A1 | 2/1983 |
| FR | 962130 | 6/1950 |
| WO | WO 91/06155 | 5/1991 |

OTHER PUBLICATIONS

Bennett et al., "Time-Domain Electromagnetics and its Applications", Proceedings of the IEEE, vol. 66, No. 3, Mar. 1978, pp. 299-318.

Harmuth, Nonsinusoidal Waves for Radar and Radio Communication, Academic Press, Inc., Copyright 1981, pp. 142-143, 288-289, 292-293, 206-207 and 302-305.

Harmuth, "Transmission of Information by Orthogonal Functions", 2d Ed., Springer-Verlag, 1972, pp. 244-245, 282-291.

Harmuth, "Selective Reception of Periodic Electromagnetic Waves with General Time Variation", IEEE Trans. on Electro. Compatibility, vol. EMC-19(3), Aug. 1977, pp. 1327-1344.

Harmuth, "Range-Doppler Resolution of Electromagnetic Walsh Waves of Radar", IEEE Transactions on Electromagnetic Compatibility, vol. EMC-17(2), May 1975, pp. 106-111.

Harmuth, "Santennas and Waveguides for Nonsinusoidal Waves", Academic Press, Inc., Copyright 1984, pp. 2-27.

Harmuth, "Sequency Theory: Foundations and Applications", Academic Press, Inc., Copyright 1977, pp. 122-123, 126-135, 235-239, 284-285, 294-295, 300-301, 316-319 and 340-341.

McGuire et al., "A Common-Wave Duplex Pulse-Communication System," Journal of the Institution of Electrical Engineers, vol. 94, No. 13, 1947, pp. 528-532.

Meleshko, "Nanosecond Electronics in Experimental Physics", Ehnergoatomizdat Press, Moscow, 1987, pp. 58-68.

Miller, (ed.), "Time-Domain Measurements in Electromagnetics", Van Nostrand Reinhold Company, Inc., Copyright 1986, pp. 1-43.

Scholtz, "Multiple Access with Time-Hopping Impulse Modulation", (Invited paper), MILCOM '93, Bedford, MA, Oct. 11-14, 1993, pp. 1-5.

Varganov et al., "Radar Response of Flight Vehicles", Radio Isvyaz' Press, Moscow, 1985, p. 5.

Withington, et al. "An Impulse Radio Communications System", Plenum Press 1993, pp. 113-120.

Office Action issued in U.S. Appl. No. 10/411,090 dated May 22, 2007.

Office Action issued in U.S. Appl. No. 10/411,090 dated Feb. 12, 2007.

Office Action issued in U.S. Appl. No. 10/411,090 dated Aug. 15, 2006.

Office Action issued in U.S. Appl. No. 10/411,090 dated Mar. 3, 2006.

*Ultra-Wideband, Short-Pulse Electromagnetics* by Henry L. Bertoni, et al., pp. 113-120 1993.

* cited by examiner

MODULATION DITHER

FAST LOCKING MECHANISM FOR CHANNELIZED ULTRAWIDE-BAND COMMUNICATIONS

CROSS-REFERENCE TO RELATED APPLICATIONS

This application is a continuation of U.S. patent application Ser. No. 10/411,090, filed Apr. 11, 2003, now U.S. Pat. No. 7,321,611 which is a continuation of U.S. patent application Ser. No. 09/158,570, filed Sep. 22, 1998, now abandoned which is a continuation of U.S. patent application Ser. No. 08/761,602, filed Dec. 6, 1996, now U.S. Pat. No. 5,832,035, entitled "Fast Locking Mechanism for Channelized Ultrawide-Band Communication," which is an FWC of U.S. patent application Ser. No. 08/487,990, filed Jun. 7, 1995, now abandoned, which is a continuation-in-part of commonly owned, U.S. patent application Ser. No. 08/309,973, filed Sep. 20, 1994, now U.S. Pat. No. 5,677,927, entitled "Ultrawide-Band Communications System and Method," and U.S. patent application Ser. No. 08/428,489, filed Apr. 27, 1995, now U.S. Pat. No. 5,687,169, entitled "Full Duplex Ultrawide-Band Communications System and Method," all of which are incorporated herein by reference and to which 35 U.S.C. § 120 priority is hereby claimed.

BACKGROUND OF THE INVENTION

1. Field of the Invention

The present invention relates to the field of communications, and more particularly, the present invention relates to a fast locking mechanism for channelized ultrawide-band communications.

2. Related Art

Conventional transceivers operating with narrow band signals typically use the same antenna to transmit and receive signals. The transmit and receive signals are usually the same or very close in frequency. Switching between the transmit and receive mode can be done at very high rates, depending on the density of each packet of data.

Full duplex operation has traditionally been accomplished by either frequency domain or a time domain multiple access (FDMA or TDMA). In order to isolate the transmitter and receiver, FDMA uses frequency filters and hybrids, while TDMA uses a duty cycle scheme in which the transmitter and receiver alternate operation.

An example of an FDMA full duplex voice communication system is an amateur radio transceiver that operates with different transmit and receive frequencies. For example, the separated frequencies could be 144 Mhz and 436 Mhz. In such a system, the antennas are usually different, and filters must be used in the receiver to eliminate transmitter noise from the adjacent transmit antenna. Otherwise, the receiver could easily be overloaded by its own transmitter.

Impulse radio technology, on the other hand, is ultrawide-band by definition. The original descriptions of impulse radio may be found in a number of United States Patents by the present inventor. Three of these are U.S. Pat. Nos. 4,641,317 (issued Feb. 3, 1987), 4,813,057 (issued Mar. 14, 1989) and 4,979,186 (issued Dec. 18, 1990). Because of the ultrawide-band characteristics of impulse radio, it is difficult to modify impulse radio systems to use conventional duplex schemes.

In order to achieve full duplex in impulse radio technology, separate transmit and receive antennas are required for hand-held transceiver applications. This is because the receiver can not be disconnected from the antenna fast enough to permit transmission using the same antenna. Therefore, the size of the impulse radio antennas must be relatively small.

An impulse radio system with many users communicating with one another requires that they all have the same size antennas. In addition, for impulse radio communications in the same bandwidth, it is assumed that the transmit and receive antennas are the same size as well. These constraints complicate the implementation of full duplex in impulse radio technology, because both the transmitter and receiver are usually operated in the same ultrawide frequency bandwidth.

Impulse radio technology permits operation at rates so high that there is no time for the signal to reach the intended receiver before the next pulse is transmitted. This situation causes several pulses to be present in the space between the two transceiver units. When there is motion between them such as in mobile communications, there occurs the unavoidable condition wherein the transmitter and receiver must operate simultaneously.

In order to operate in full duplex mode in a mobile environment, the transmitter and receiver would be required to operate simultaneously whenever the distance separating them increases or decreases by a multiple of C/R, where C is the speed of light and R is the repetition rate. For example, if R=1 million pulses per second, these zones would be about 300 meters, and so on. Although full duplex mode of operation is very desirable, this effect makes it unpractical to do so.

In order for pairs of users to simultaneously communicate independently, some form of channelization is required to avoid cross-talk. One channelization technique is to use different pulse repetition rates for each pair of transceivers that communicate in proximity of other transceivers. This technique, however, has limited channel capacity as limited discrete pulse repetition rates are actually available for impulse radio communications and may interfere with other communication services.

A second approach to channelization is to use different pseudo random noise (PN) codes. According to this technique, the number of channels for impulse radio communications is only limited by the complexity and uniqueness of orthogonal (i.e., non-interfering) PN codes. The inherent complexity of using PN codes for channelization is that the codes must be identifiable (i.e., acquisitioned and locked) and decoded in a short period of time for full duplex communications to be realized.

What is needed for this PN coded approach is an acquisition mechanism that is applicable to impulse radio technology, and that permits fast locking of impulse radio signals.

SUMMARY OF THE INVENTION

The present invention is directed to a fast locking mechanism for channelized ultrawide-band communications in an impulse radio receiver. An acquisition and lock method includes sliding a periodic timing signal. A decode signal is produced using the periodic timing signal, wherein successive decode signals are coded by successive chips of a pseudo noise (PN) code having a predetermined modulo length. A received impulse radio signal is cross correlated with the decode signal to output a baseband signal. T samples of the baseband signal are integrated to output an integration result that is then compared with a threshold value to output a channel coincidence signal.

If channel coincidence (i.e., acquisition) is detected, a constant rate-control signal is output to stop the periodic timing signal from sliding. Otherwise, the periodic timing signal is adjusted, and successive trials of T pulses of the periodic timing signal are integrated and threshold detected until channel coincidence is detected. Typically, the process is stop acquisition if the entire PN code modulo length is completed before channel coincidence is detected.

A receiver for acquisition and lock of an impulse radio signal comprises an adjustable time base to output the periodic timing signal having an adjustable repetition rate, and a decode timing modulator to output the decode signal in response to the periodic timing signal. A cross correlator in the receiver cross correlates the impulse radio signal with the decode signal to output a baseband signal.

The receiver integrates T samples of the baseband signal and a threshold detector uses the integration results to detect channel coincidence. A receiver controller stops sliding the time base when channel coincidence is detected. A counter and extra count logic, coupled to the controller, are configured to increment or decrement the address counter by a one or or more extra counts. This count adjustment is made after each T pulses is reached in order to shift the PN code modulo for proper phase alignment of the periodic timing signal and the received impulse radio signal.

In an alternative embodiment, plural decode signals are generated and are cross correlated with received impulse radio signals using a plurality of cross correlators to reduce the time to acquire channel lock. In still a further embodiment, a fast cross correlator can be used.

BRIEF DESCRIPTION OF THE FIGURES

In the drawings, like reference numbers indicate identical or functionally similar elements. Additionally, the left-most digit of the reference number identifies the drawing in which the reference number first appears.

DETAILED DESCRIPTION OF THE PREFERRED EMBODIMENTS

Table of Contents

Figure 1A:
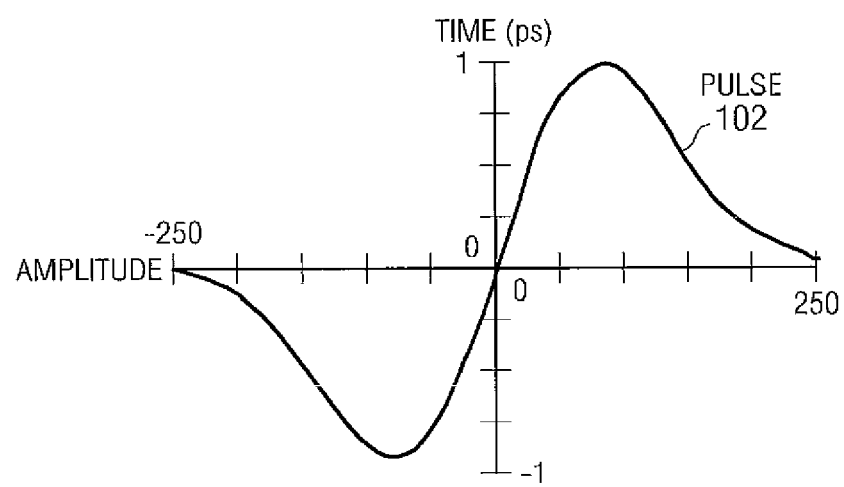
FIGS. 1A and 1B show a 2 GHz center frequency monocycle pulse in the time and frequency domains, respectively, in accordance with the present invention.

I. Overview . . . 11
II. Technology Basics . . . 12
   A. Gaussian Monocycle . . . 13
   B. A Pulse Train . . . 15
   C. Modulation . . . 15
   D. Coding for Energy Smoothing and Channelization . . . 16
   E. Reception and Demodulation . . . 17
   F. Jam Resistance . . . 18
   G. Processing Gain . . . 18
   H. Capacity . . . 19
   I. Multipath and Propagation . . . 20
III. Full Duplex for Impulse Radio Communication Systems . . . 22
   A. The Impact of the Width of the Dither Window on System Performance . . . 28
IV. Exemplary Transceiver Hardware . . . 29
   A. Transmitter . . . 29
   B. Receiver . . . 30
   C. Time Hand-off . . . 32
   D. Differential Rate Duplex . . . 33
V. Other Considerations . . . 34
VI. Fast Locking Mechanism for Channelized Ultrawideband Communications . . . 35

VII. Fast Locking Analysis and Operation . . . 39

VIII. Conclusion . . . 42

I. Overview

A new technology-called ultra-wideband radio-promises to help overcrowding of the radio spectrum. Unlike conventional wireless systems, which use narrowband modulated carrier waves to transmit information, ultra-wideband transmits over a wide swath of radio spectrum. Ultra-wideband may cause significantly less interference than conventional narrowband radio solutions while safely coexisting with other wireless technologies on the market. Thus, ultra-wideband systems may allow a number of devices to share the same radio spectrum, helping to alleviate the crowding of the radio spectrum. One embodiment of ultra-wideband radio is an impulse radio as described in more detail below. While embodiments of the present invention have been described in conjunction with impulse radio, it will, however, be generally understood that embodiments of the present invention will apply equally well to virtually all other types of ultra-wideband radios and systems.

Impulse radios generally have: short duration pulses; center frequencies typically between 50 MHz and 10 gigahertz (GHz); ultrawide bandwidths of 100+% of the center frequency; multi-mile ranges with sub-milliwatt average power levels, even with low gain antennas; extremely low power spectral densities; lower cost than other sophisticated radio designs, especially spread spectrum systems; and excellent immunity to jamming from other systems and to multipath fading.

Impulse radios have exceptional multipath immunity and are relatively simple and less costly to build, especially in comparison to spread spectrum radios. Impulse radio systems consume substantially less power than existing conventional radios. Additionally, impulse radio systems occupy less space than existing portable telecommunications transceivers. Because of these characteristics, impulse radio is an optimal technology for a wide variety of applications, including personal communications systems and in-building communications systems.

Copending, commonly assigned U.S. patent application Ser. No. 08/309,973; U.S. Pat. No. 5,677,927 (filed Sep. 20, 1994, and titled An Ultrawide-Band Communication System and Method; which is incorporated herein by reference and referred to as the '973 application) describes the following impulse radio features: the use of impulse radio subcarriers; the time modulator that is used for code time delaying and subcarrier time delaying; linearization of the time modulator; pseudo Manchester coding for modulation of digital data using impulse radio communications; and a lock acquisition scheme for the impulse radio receiver to acquire and maintain lock of impulse radio signals. A full duplex impulse radio system is described in copending, commonly assigned U.S. patent application Ser. No. 08/428,489; U.S. Pat. No. 5,687,163 (filed Apr. 27, 1995, and titled Full Duplex Ultrawide-Band Communication System and Method, which is also incorporated herein by reference).

Section II is directed to technology basics and provides the reader with an introduction to impulse radio concepts, as well as other relevant aspects of communications theory.

Section III is directed full duplex for impulse radio communication systems. This section includes subsections relating to the theory of operation of full duplex for an impulse radio transceiver.

Section VI is directed to embodiments of a fast locking mechanism for channelized ultrawide-band communications.

II. Technology Basics

As stated above, this section is directed to technology basics and provides the reader with an introduction to impulse radio concepts, as well as other relevant aspects of communications theory. This section includes subsections relating to Gaussian monocycle pulses, pulse trains of gaussian monocycle pulses, modulation, coding, and qualitative and quantitative characteristics of these concepts.

Impulse radio transmitters emit short Gaussian monocycle pulses with a tightly controlled average pulse-to-pulse interval. Impulse radio transmitters use pulse widths of between 20 and 0.1 nanoseconds (ns) and pulse-to-pulse intervals of between 2 and 5000 ns. These narrow monocycle pulses have inherently wide-band frequency characteristics.

Impulse radio systems uses pulse position modulation, with the actual pulse-to-pulse interval being varied on a pulse-by-pulse basis by two components: an information component and a pseudo-random code component. Unlike spread spectrum systems, the pseudo-random code is not necessary for energy spreading (because the impulses themselves are inherently wide-band), but rather for channelization, energy smoothing in the frequency domain, and jamming resistance.

The impulse radio receiver is a direct conversion receiver with a cross correlator front end. The front end coherently converts the electromagnetic pulse train to a baseband signal in one stage. The impulse radio receiver integrates multiple pulses to recover each bit of the transmitted information.

A. Gaussian Monocycle

Figure 1B:
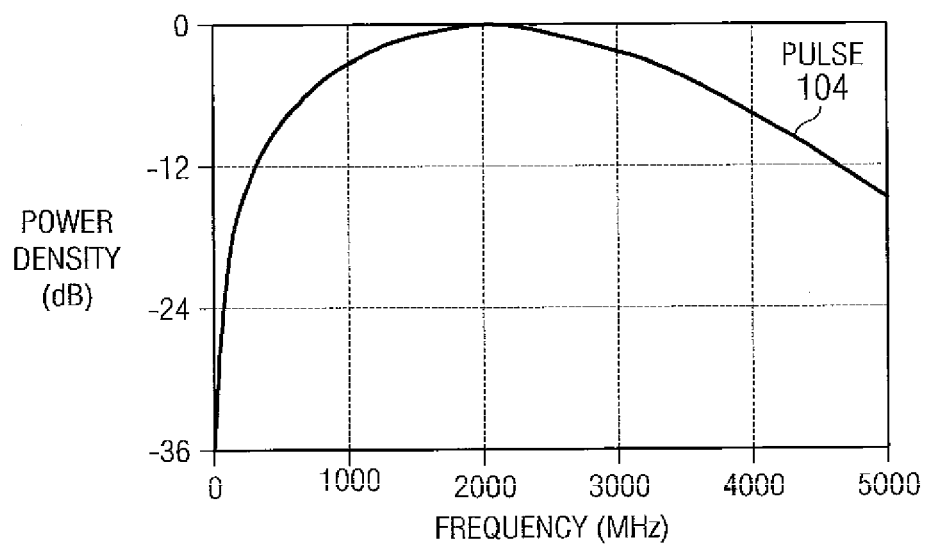

The most basic element of impulse radio technology is the practical implementation of Gaussian monocycles, which are also referred to herein as Gaussian monocycle pulses. A Gaussian monocycle is the first derivative of the Gaussian function. FIGS. 1A and 1B show a 2 GHz center frequency (i.e., a 0.5 ns pulse width) monocycle pulse in the time and frequency domains (see 102 and 104, respectively). (Actual practice prevents the transmission of a perfect Gaussian monocycle. In the frequency domain, this results in a slight reduction in the signal's bandwidth.) These monocycles, which are sometimes called impulses, are not gated sine waves.

The Gaussian monocycle waveform is naturally a wide bandwidth signal, with the center frequency and the bandwidth completely dependent upon the pulse's width. In the time domain, the Gaussian monocycle is described mathematically by:

$$V(t) = A \frac{\sqrt{2e}}{\tau} t e^{-\left(\frac{t}{\tau}\right)^2}$$

Where, A is the peak amplitude of the pulse, t is time, and τ (tau) is a time decay constant.

In the frequency domain, the Gaussian monocycle envelope is:

$$V(\omega) = A\omega\tau^2 \sqrt{2\pi e}\, e^{-\frac{\omega^2\tau^2}{2}}$$

The center frequency is then:

$$fc = \frac{1}{2\pi\tau} \text{ Hz}$$

Relative to c, the 3 dB down points (power) are:

$f_{lower}$=0.319c; $f_{upper}$=1.922c.

Thus, the bandwidth is approximately 160% of the center frequency. Because τ (tau) also defines the pulse width, then the pulse width specifies both the center frequency and bandwidth. In practice, the center frequency of a monocycle pulse is approximately the reciprocal of its length, and its bandwidth is approximately equal to 1.6 times the center frequency. Thus, for the "0.5 ns" pulse shown in FIGS. 1A and 1B:

$f_c$=2.0 GHz; $\Delta f_c$=3.2 GHz.

B. A Pulse Train

Impulse radio systems use pulse trains, not single pulses, for communications. As described in detail in Section III below, the impulse radio transmitter produces and outputs a train of pulses for each bit of information.

Figure 2A:
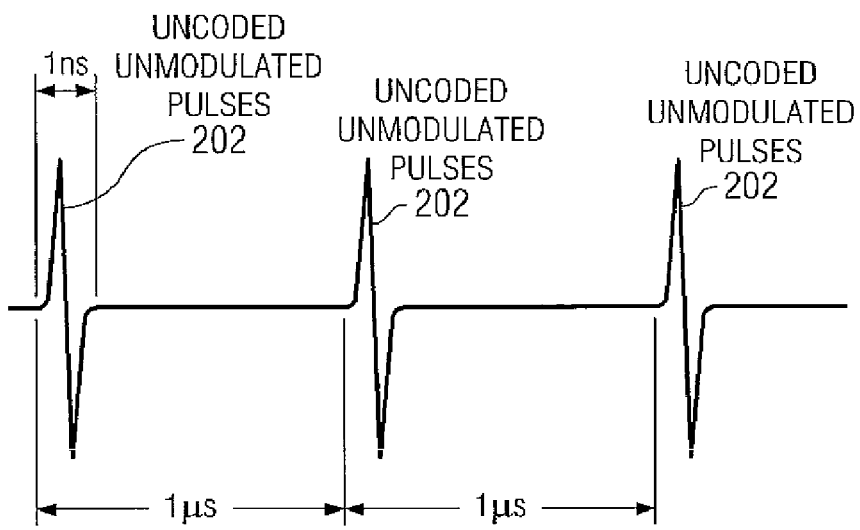
FIGS. 2A and 2B are illustrations of a 1 mpps system with 1 ns pulses in the time and frequency domains, respectively, in accordance with the present invention.
Figure 2B:
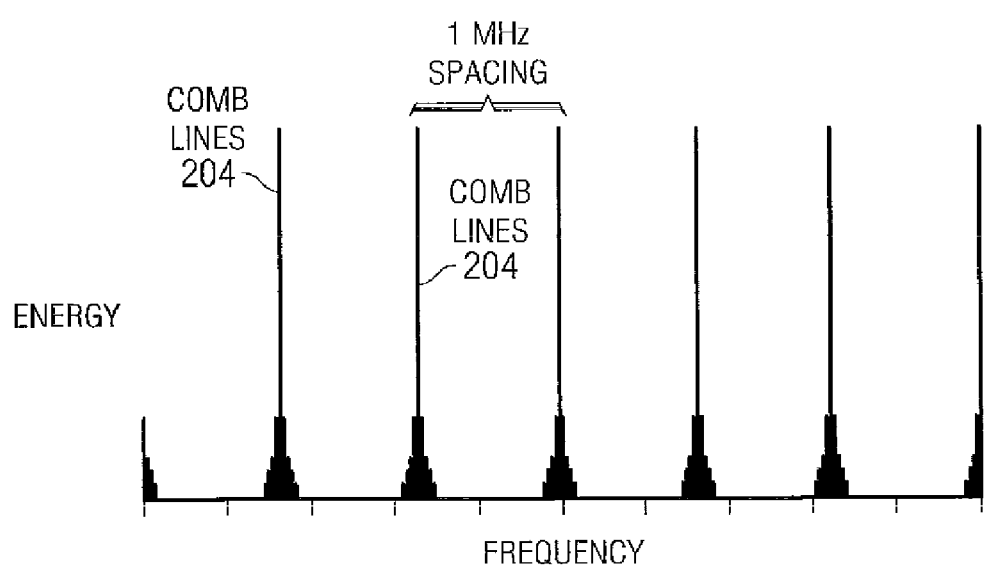

Prototypes built by the inventors have pulse repetition frequencies of between 0.7 and 10 megapulses per second (mpps, where each megapulse is $10^6$ pulses). FIGS. 2A and 2B are illustrations of a 1 mpps system with (uncoded, unmodulated) 1 ns pulses in the time and frequency domains (see 102 and 104, respectively). In the frequency domain, this highly regular pulse train produces energy spikes (comb lines 204) at one megahertz intervals; thus, the already low power is spread among the comb lines 204. This pulse train carries no information and, because of the regularity of the energy spikes, might interfere with conventional radio systems at short ranges.

Impulse radio systems have very low duty cycles so the average power in the time domain is significantly lower than the peak power in the time domain. In the example in FIGS. 2A and 2B, for example, the impulse transmitter operates 0.1% of the time (i.e., 1 ns per microsecond (μs)).

Additional processing is needed to modulate the pulse train so that the impulse radio system can actually communicate information. The additional processing also smoothes the energy distribution in the frequency domain so that impulse radio transmissions (e.g., signals) interfere minimally with conventional radio systems.

C. Modulation

Figure 3:
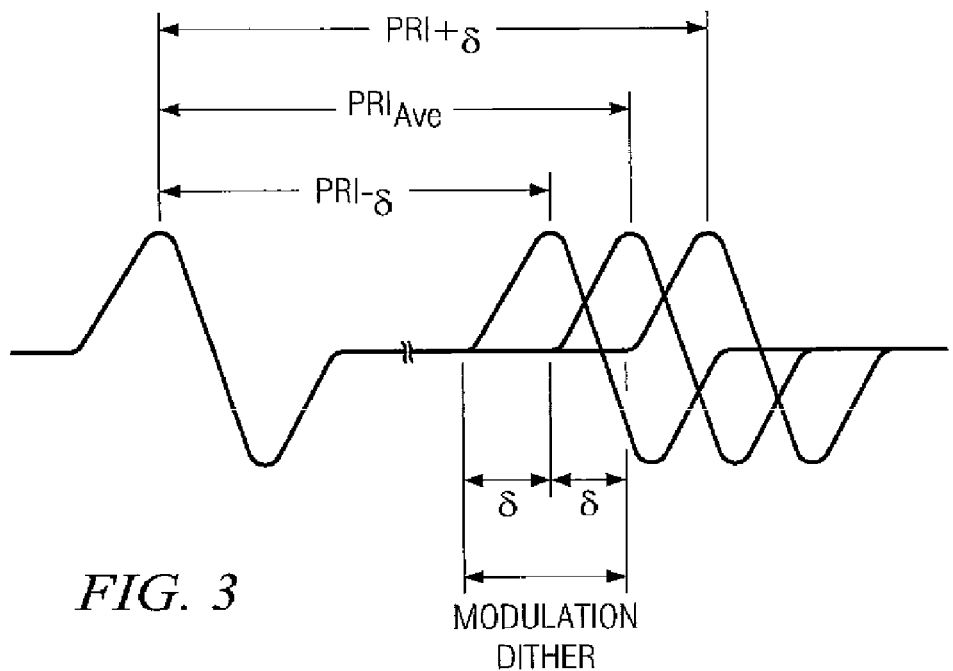
FIG. 3 illustrates a modulating signal that changes the pulse repetition interval (PRI) in proportion to the modulation in accordance with the present invention.

Amplitude and frequency/phase modulation are unsuitable for this particular form of impulse communications; the only suitable choice is pulse position modulation, which allows the use of a matched filter (i.e., cross correlator) in the receiver. As illustrated in FIG. 3, a modulating signal changes the pulse repetition interval (PRI) in proportion to the modulation.

If the modulating signal were to have three levels, the first level might shift the generation of the pulse forward in time from the nominal by ∂ picoseconds (ps); the second level might not shift the pulse position in time from the nominal at all; and the third level might delay the pulse by ∂ ps. This would be a digital modulation scheme. Analog modulation would allow continuous deviations between PRI−∂ and PRI+∂. In the impulse radio system the maximum value of ∂ is t/4, where t=time of the pulse. The time measurement is assumed to be taken from the same part of the monocycle waveform on successive monocycles.

In the frequency domain, pulse position modulation distributes the energy over more frequencies. For example, in the case of a 1 mpps system where the modulation dither (d) is 100 ps, the PRI is 1,000,000 Hertz (Hz) and the additional frequency components are: 999,800.04 Hz, 999,900.01 Hz, 1,000,100.01 Hz, and 1,000,200.04 Hz. (Dither is an impulse radio communications term for moving the position of a pulse in time.) Transmitted energy is now distributed among more spikes (comb lines) in the frequency domain. If the total transmitted energy remains constant, the energy in each frequency spike decreases as the number of possible pulse positions increases. Thus, in the frequency domain, the energy is more smoothly distributed.

D. Coding for Energy Smoothing and Channelization

Because the receiver is a cross correlator, the amount of time position modulation required for one-hundred percent modulation is calculated by the inverse of $f_c$/4 (where $f_c$ is the center frequency). For a monocycle with a center frequency of 1.3 GHz, for example, this corresponds to ±157 (ps) of time position modulation. The spectrum-smoothing effects at this level of time dither is negligible.

Figure 4:
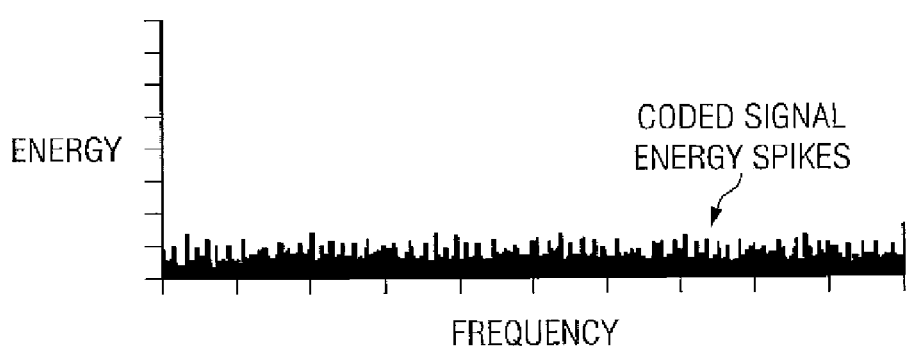
FIG. 4 is a plot illustrating the impact of pseudo-random dither on energy distribution in the frequency domain in accordance with the present invention.

Impulse radio achieves optimal smoothing by applying to each pulse a PN code dither with a much larger magnitude than the modulation dither. FIG. 4 is a plot illustrating the impact of pseudo-random dither on energy distribution in the frequency domain. FIG. 4, when compared to FIG. 2B, shows the impact of using a 256 position PN code relative to an uncoded signal.

PN dithering also provides for channelization (channelization is a procedure employed to divide a communications path into a number of channels). In an uncoded system, differentiating between separate transmitters would be very hard. PN codes create channels, if the codes themselves are relatively orthogonal (i.e., there is low correlation and/or interference between the codes being used).

E. Reception and Demodulation

Clearly, if there were a large number of impulse radio users within a confined area, there might be mutual interference. Further, while the use of the PN coding minimizes that interference, as the number of users rises the probability of an individual pulse from one user's sequence being received simultaneously with a pulse from another user's sequence increases. Fortunately, implementations of an impulse radio according to the present invention do not depend on receiving every pulse. The impulse radio receiver performs a correlating, synchronous receiving function (at the RF level) that uses a statistical sampling of many pulses to recover the transmitted information.

Impulse radio receivers typically integrate 200 or more pulses to yield the demodulated output. The optimal number of pulses over which the receiver integrates is dependent on a number of variables, including pulse rate, bit rate, jamming levels, and range.

F. Jam Resistance

Besides channelization and energy smoothing, the PN coding also makes impulse radio highly resistant to jamming from all radio communications systems, including other impulse radio transmitters. This is critical as any other signals within the band occupied by an impulse signal act as a jammer to the impulse radio. Since there are no unallocated 1+GHz bands available for impulse systems, they must share spectrum with other conventional and impulse radios without being adversely affected. The PN code helps impulse systems discriminate between the intended impulse transmission and transmissions from others.

Figure 5:
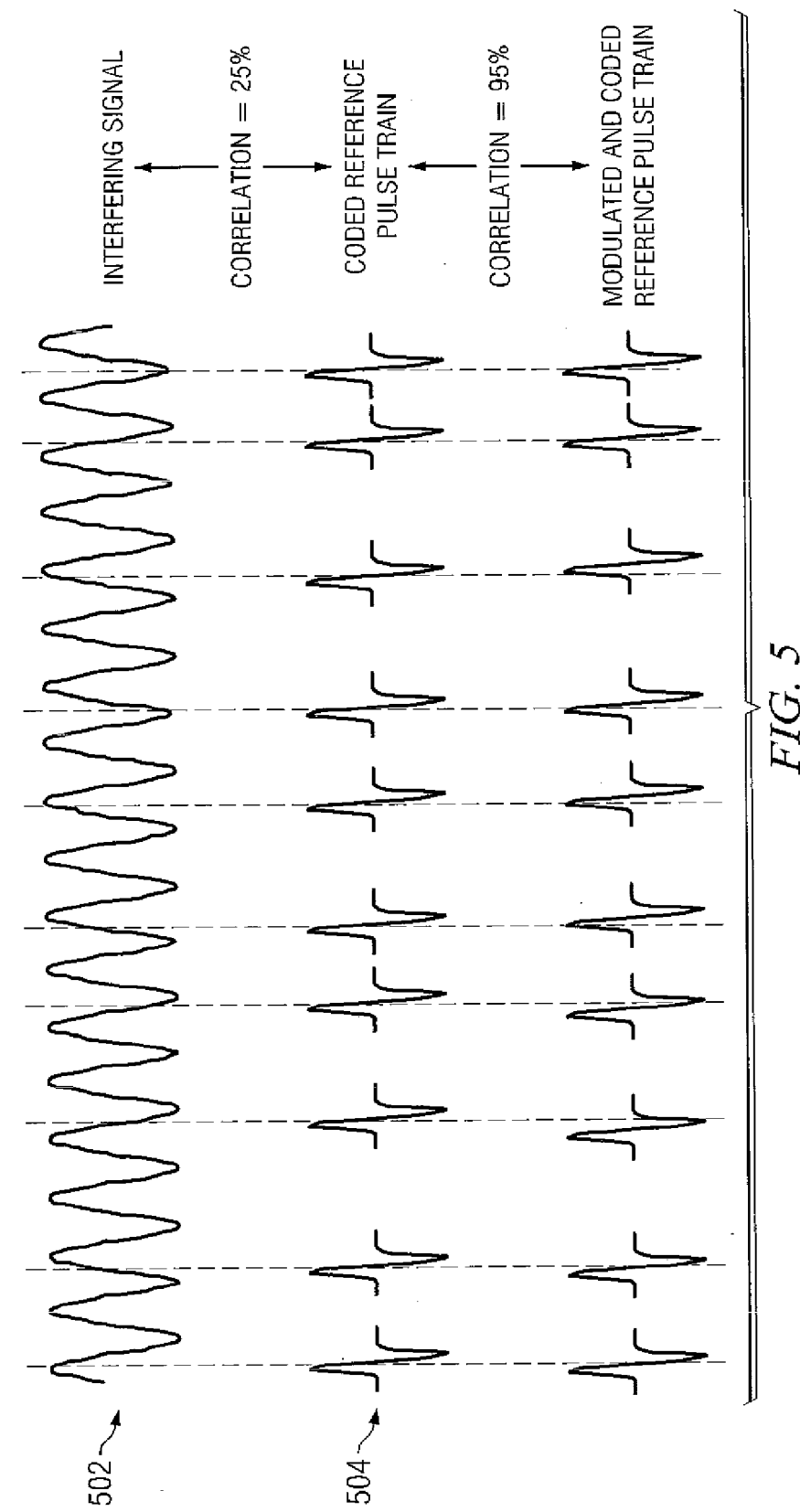
FIG. 5 illustrates the result of a narrowband sinusoidal (interference) signal overlaying an impulse radio signal in accordance with the present invention.

FIG. 5 illustrates the result of a narrowband sinusoidal jamming (interference) signal 502 overlaying an impulse radio signal 504. At the impulse radio receiver, the input to the cross correlator would include that narrowband signal 502, as well as the received ultrawide-band impulse radio signal 504. Without PN coding, the cross correlator would sample the jamming signal 502 with such regularity that the jamming signals could cause significant interference to the impulse radio receiver. However, when the transmitted impulse signal is encoded with the PN code dither (and the impulse radio receiver is synchronized with that identical PN code dither) it samples the jamming signals randomly. According to the present invention, integrating over many pulses negates the impact of jamming.

In statistical terms, the pseudo-randomization in time of the receive process creates a stream of randomly distributed values with a mean of zero (for jamming signals). Therefore, to eliminate the impact of jammers all that is necessary is to sample over enough pulses (i.e., integrate over a sufficiently large number of pulses) to drive the impact of the jamming signals to zero.

G. Processing Gain

Impulse radio is jam resistant because of its large processing gain. For spread spectrum systems, the definition of processing gain, which quantifies the decrease in channel interference when wide-band communications are used, is the ratio of the bandwidth of the channel to the bandwidth of the information signal. For example, a direct sequence spread spectrum system with a 10 kHz information bandwidth and a 16 MHz channel bandwidth yields a processing gain of 1600 or 32 dB. However, far greater processing gains are achieved with impulse radio systems where, for the same 10 kHz information bandwidth and a 2 GHz channel bandwidth, the processing gain is 200,000 or 53 dB.

The duty cycle (e.g., of 0.5%) yields a process gain of 28.3 dB. (The process gain is generally the ratio of the bandwidth of a received signal to the bandwidth of the received information signal.) The effective oversampling from integrating over multiple pulses to recover the information (e.g., integrating over 200 pulses) yields a process gain of 28.3 dB. Thus, a 2 GHz divided by a 10 mpps link transmitting 50 kilobits per second (kbps) would have a process gain of 49 dB, (i.e., 0.5 ns pulse width divided by a 100 ns pulse repetition interval would have a 0.5% duty cycle, and 10 mpps divided by a 50,000 bps would have 200 pulses per bit.)

H. Capacity

Figure 6:
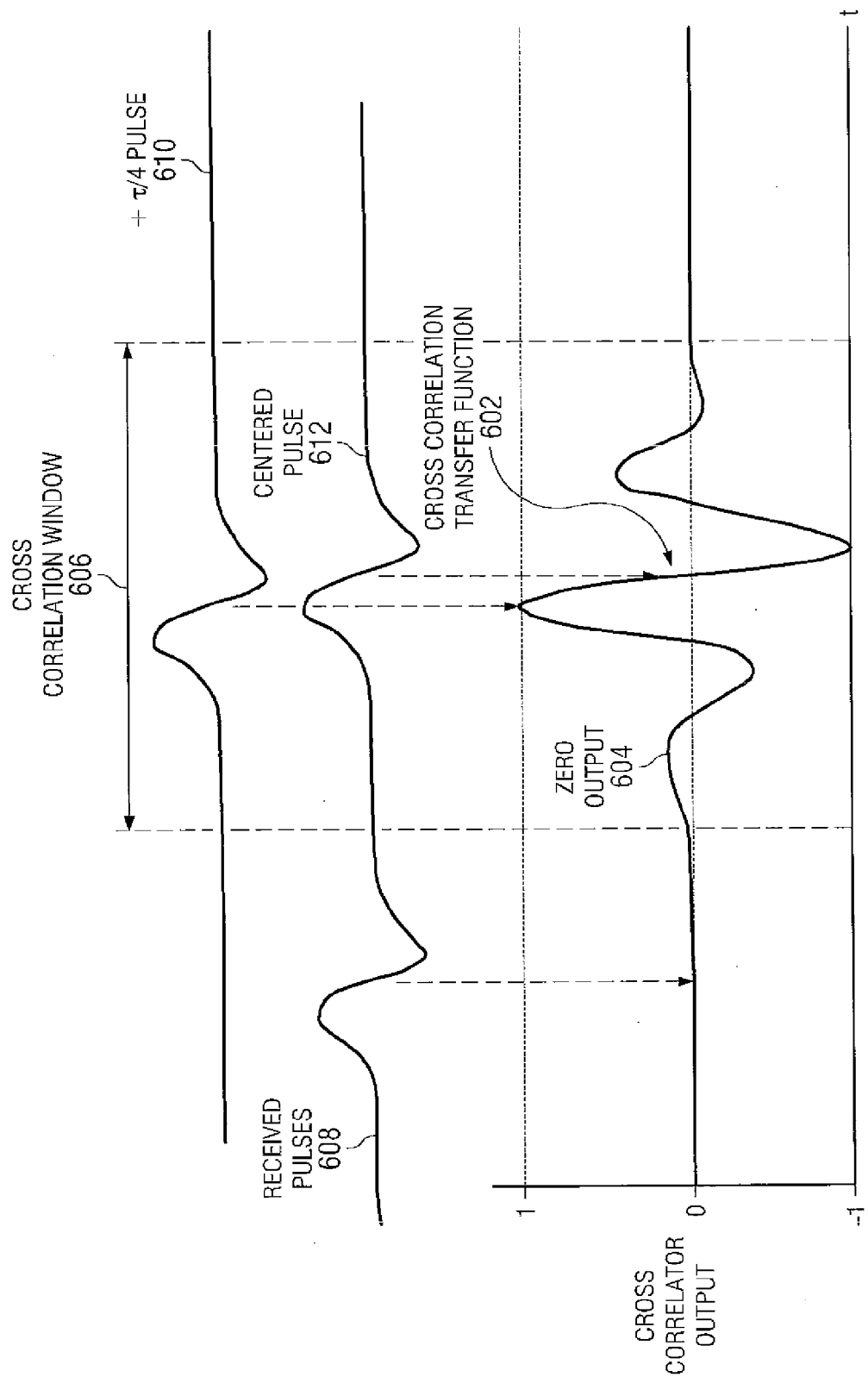
FIG. 6 shows the "cross correlator" transfer function of an impulse radio receiver in accordance with the present invention.

Theoretical analyses suggests that impulse radio systems can have thousands of voice channels per cell. To understand the capacity of an impulse radio system one must carefully examine the performance of the cross correlator. FIG. 6 shows the "cross correlator transfer function" 602. This represents the output value of an impulse radio receiver cross correlator for any given received pulse. As illustrated at 604, the cross correlator's output is 0 volts when pulses arrive outside of a cross correlation window 606. As a received pulse 608 slides through the window, the cross correlator output varies. It is at its maximum (e.g., 1 volt) when the pulse is T/4 ahead of the center of the window (as shown at 610), 0 volts when centered in the window (as shown at 612); and at its minimum (e.g., −1 volt) when it is T/4 after the center (not shown).

When the receiving system is synchronized with the intended transmitter, the cross correlator's output has a swing of between ±1 volt (as a function of the transmitter's modulation). Other in-band transmission would cause a variance to the cross correlator's output value. This variance is a random variable and can be modelled as a Gaussian white noise signal with a mean value of 0. As the number of interferers increases, the variance increases linearly. By integrating over a large number of pulses, the receiver develops an estimate of the transmitted signal's modulation value. Mathematically:

$$\text{Variance of the Estimate} = \frac{N\sigma}{\sqrt{Z}}$$

Where N=number of interferers, σ is the variance of all the interferers to a single cross correlation, and Z is the number of pulses over which the receiver integrates to recover the modulation.

This is a good relationship for a communications system, for as the number of simultaneous users increases, the link quality degrades gradually (rather than suddenly).

I. Multipath and Propagation

Multipath fading, the bane of sinusoidal systems, is much less of a problem (i.e., orders of magnitude less) for impulse systems than for conventional radio systems. In fact, Rayleigh fading, so noticeable in cellular communications, is a continuous wave phenomenon, not an impulse communications phenomenon.

In an impulse radio system, in order for there to be multipath effects special conditions must persist. First, the path length traveled by the scattered pulse must be less than the pulse's width times the speed of light. Second, successively emitted pulses at the transmitter may arrive at the receiver at the same time neglecting the decorrelation benefits of time coding.

For the former (with a one nanosecond pulse), that equals 0.3 meters or about 1 foot (i.e., 1 ns×300,000,000 meters/second). (See FIG. 7, in the case where the pulse traveling "Path 1" arrives one half a pulse width after the direct path pulse.)

For the latter (with a 1 megapulse per second system), that would be equal to traveling an extra 300, 600, 900, etc. meters. However, because each individual pulse is subject to the pseudo-random dither, these pulses are decorrelated.

Figure 7:
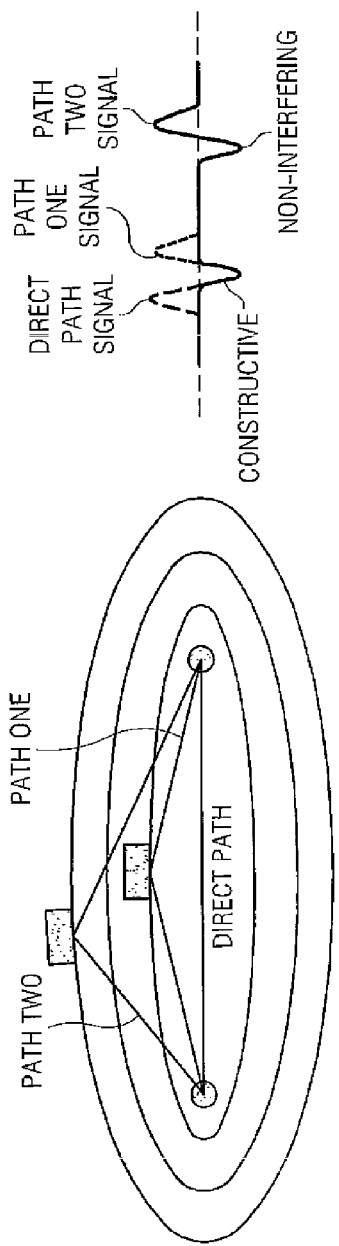
FIG. 7 illustrates impulse radio multipath effects in accordance with the present invention.

Pulses traveling between these intervals do not cause self-interference (in FIG. 7, this is illustrated by the pulse traveling Path 2). However, pulses traveling grazing paths, as illustrated in FIG. 7 by the narrowest ellipsoid, create impulse radio multipath effects.

Figure 8:
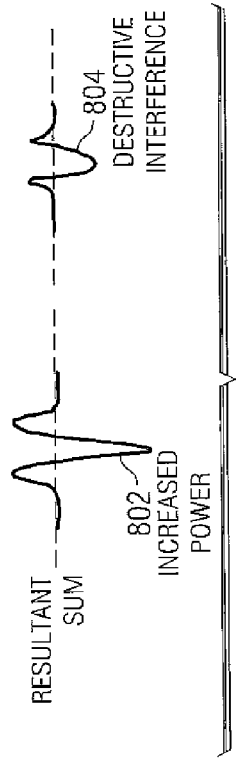
FIG. 8 illustrates the phase of the multipath pulse in accordance with the present invention.

As illustrated in FIG. 8 at 802, if the multipath pulse travels one half width of a pulse width further, it increases the power level of the received signal (the phase of the multipath pulse will be inverted by the reflecting surface). If the pulse travels less than one half a pulse width further, it will create destructive interference as shown at 804. For a 1 ns pulse, for example, destructive interference will occur if the multipath pulse travels between 0 and 15 cm (0 and 6 inches).

Tests of impulse radio systems (including impulse radar tests) suggest that multipath will not present any major problems in actual operation. Additionally, shorter pulse widths are also envisioned, which will further reduce the probability of destructive interference (because the reflected path length required for destructive interference will be shortened).

III. Full Duplex for Impulse Radio Communication Systems

Figure 9:
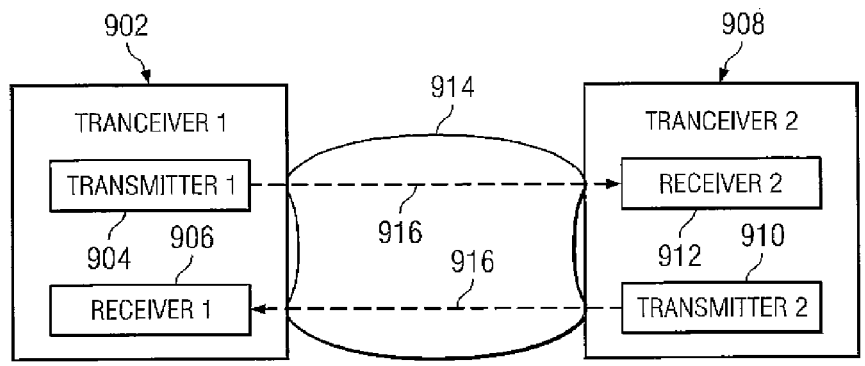
FIG. 9 shows a representative block diagram of a full duplex impulse radio system, in accordance with the present invention.

A representative block diagram of a full duplex impulse radio communication system is shown in FIG. 9. A first transceiver (A) 902 comprises a transmitter (T1) 904 and a receiver (R1) 906. A second transceiver (B) 908 comprises a transmitter (T2) 910 and a receiver (R2) 912. The transceivers 902 and 908 are separated by a propagation medium 914, such as air, space, or other medium cable of propagating ultrawide-band signals. Transmitted impulse radio signals 916 propagate through the propagation medium 914 between T1 904 and R2 912, and between T2 910 and R1 906.

The purpose for full duplex transmission in an ultrawide band impulse radio system is to provide two-way transmittal of information similar to telephony, as opposed to a walkie-talkie (i.e., a push-to-talk simplex operation). Since ultrawide band signals utilize the full electromagnetic spectrum, or at least a very large part of it, it is necessary to use some technique other than frequency domain duplexing, which is the conventional method. The inventors have therefore developed a pulse interleaving technique for full duplex impulse radio communications.

Figure 10:
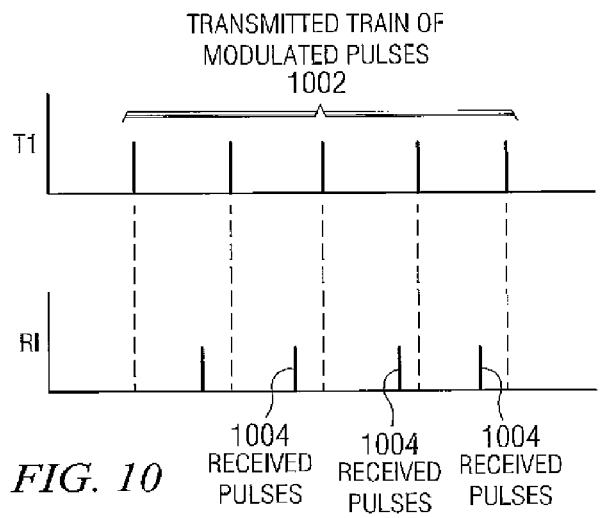
FIG. 10 shows timing of transmitted and received pulses at a transceiver.

For example, with reference to FIG. 10, if transmitter T1 904 sends out a train of modulated pulses 1002, receiver R1 906 would need to receive pulses 1004 transmitted from transmitter T2 910 during the time periods between the pulses 1002 transmitted by T1.

Figure 11:
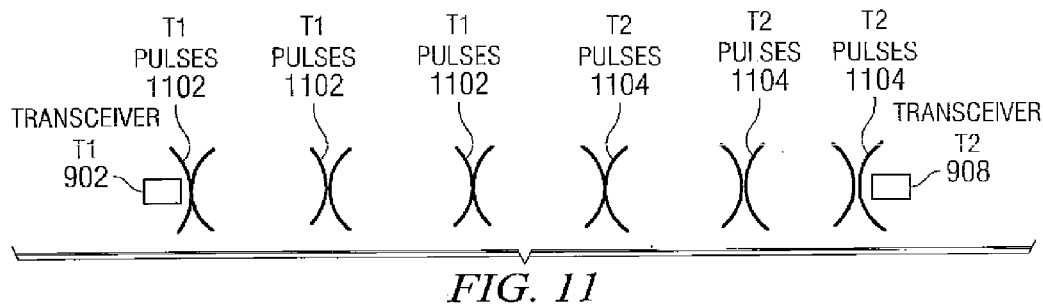
FIG. 11 shows contention zones between an impulse radio transmitter and receiver.

One complication with this implementation is that at certain integral ranges between transmitter/receiver pair number 1 (i.e., transceiver 1 and transceiver 2), it will be necessary for one or the other to transmit and receive exactly simultaneously. However, simultaneous transmission and reception requires too large of a dynamic range in the receiver to allow functionality. This means that at certain discrete locations, determined by the pulse repetition rate, it will be necessary for each transceiver to transmit and receive simultaneously. As shown in FIG. 11, pulses 1102 transmitted by T1 904 and pulses 1104 transmitted by T2 910 pass exactly on top of each other at positions called contention zones. There will be a series of these contention zones, which cannot be practically removed. Even if one or both transceivers are mobile, as they move with respect to each other, they will still create contention zones.

Figure 12:
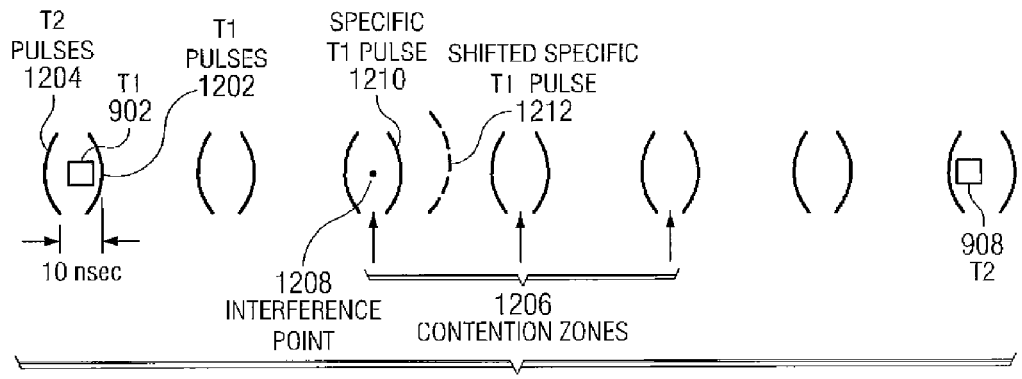
FIG. 12 shows a delay transmit technique to minimize the affect of contention zones between an impulse radio transmitter and receiver, in accordance with an embodiment of the present invention.

According to an embodiment of the present invention, T1 904 is set to emit each pulse 1202 10 nanoseconds (ns) after R1 906 receives a pulse 1204 from T2 910. This transmit delay is depicted in FIG. 12. This reduces interference between the transmitter and the receiver at transceiver 1, for example. If T1 904 transmits after it receives a pulse, those pulses cannot interfere. Since T1 904 has waited for over a whole period (one period is about 5 ns) before transmitting, most of the noise from the previous pulse has died down before the current pulse is transmitted. However, some contention zones 1206 will still exist between the two transmitters.

The easiest way to resolve these contention zones 1206 is to permit the first transceiver to have a choice of say, 10 ns or 100 ns of delay before transmitting after receiving a pulse. This removes the interference at point 1208 for example, by pushing (position in time) pulse 1210 up to point 1212 so that the self-interference is avoided.

In addition, it is important to remember that in all cases, each pulse is also time dither coded as described above. They are shown here as un-time dither coded for simplicity. Thus, time dither coding further serves to remove the interface 1208.

Figure 13:
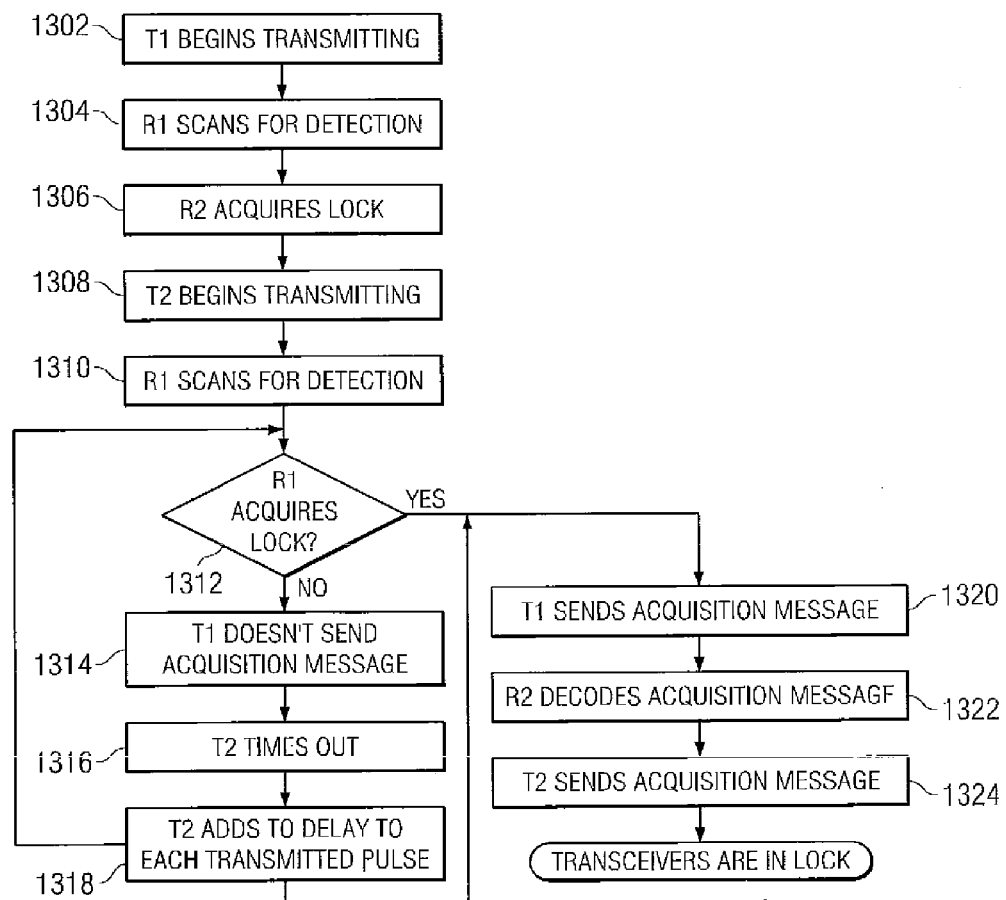
FIG. 13 shows a flow diagram for a pulse interleaving technique for full duplex impulse radio communications, in accordance with an embodiment of the present invention.

The steps required in signal acquisition for pulse interleaving are shown in a flow diagram in FIG. 13. In operation, T1 904 would begin transmitting to R2 912, as shown at a step 1302. R2 912 scans for detection and acquires lock through its scanning mechanism (see step 1304). Once it 1304). Once it acquires lock (see step 1306), its accompanying transmitter (T2 910) can begin transmitting, as shown at a step 1308. R1 906 then scans for detection, at step 1310. If R1 906 happens to be in a contention zone, then it will never acquire lock to T2 910. Therefore, at the message level, R1 906 must wait for an acknowledge message (ACK) 1306 to be conveyed to it by T1 904 before it knows whether to use the 10 ns or the 100 ns transmitter receive timing delay. If it never receives, or after a certain time does not receive the ACK that R1 906 has acquired T2 910, then T2 910 times-out and shifts its transmitted pulse timing by 100 ns, for example, and tries again. These steps are shown generally by a conditional loop at steps 1312, 1314, 1316 and 1318.

Whereupon if R2 912 does acquire lock (i.e., receives an ACK from T1 904 sent at step 1320) as shown at step 1322, T2 910 will transmit a return ACK at step 1324, a link is established, and the transceivers are in lock.

The timeout is preferably the maximum time period required for R2 912 to scan for a pulse from T1 904 over the entire modulo of the dither code. For a 256 bit code, and a fairly small code dither of 10 ns a timeout can take up to 20 seconds. Timeout is only done for an initial lock. A timeout is not needed if the transceivers switch codes or delay values. Because of the simplicity in implementation of the pulse interleave technique, pulse interleave full duplex is very economical for many communication applications, such as telemetry and transponder-type systems. In the preferred embodiment, the receiver can stay on so that a cold start is not necessary.

As discussed above, the mobile environment presents unique contention zone problems. Therefore, the following embodiments deal with the mobile environment explicitly, and are specifically directed at providing immunity to dead or contention zone problems.

Figure 14:
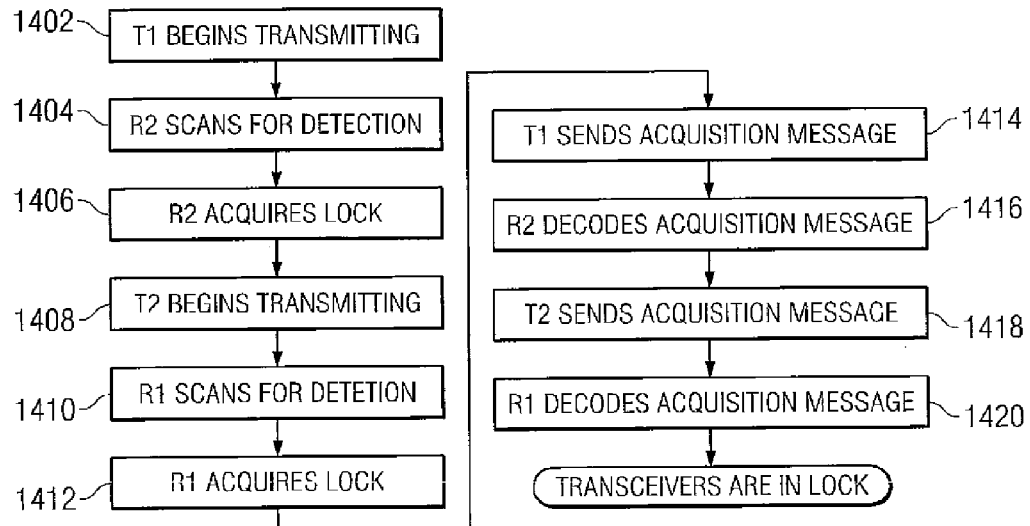
FIG. 14 shows a flow diagram for a burst interleaving technique for full duplex impulse radio communications, in accordance with an embodiment of the present invention.

One embodiment of the present invention directed to these problems is a burst interleave method. According to the burst interleave method, there is no contention at all. The burst interleave method is shown in a flow diagram in FIG. 14. T1 904 starts the process by transmitting a burst (see step 1402), which, for example, could be 10 microseconds in length.

In an exemplary embodiment, each burst contains 20 pulses at a 2 megapulse per second rate, or 50 pulses at a 5 megapulse rate. This first transmitted burst is received by R2 912 after a certain amount of time passes due to propagation delay (i.e., range delay) and scanning delay by R2 912 (see step 1404). Range delay corresponds to about 5.2 microseconds per mile (approximately 5,200 feet) or about one foot per nanosecond.

At the end of this received burst, R2 acquires lock (see step 1406) and then T2 910 transmits its burst containing information modulation (at step 1408), and after the same range delay, R1 scans for detection (step 1410) and acquires lock (step 1412). If the timing between the bursts is sufficient, then under no circumstance(s) of position or range between the transceivers do the bursts collide. The criterion is that the delay between bursts be sufficient to accommodate the round trip delay and burst width. In practice, the burst should be as far away as possible before using up all the margin of receive time in this receiver before it will be required to transmit again. The transceivers then swap acquisition messages, as shown at steps 1414, 1416, 1418 and 1420, to complete the locking process.

A further embodiment of the present invention uses code division multiple access (CDMA) for achieving full duplex communication in an ultrawide band impulse radio system. In this variation T1 904 and T2 910 are operated with different time dither codes, with dither windows nearly equalling the full frame so that each successive pulse can appear anywhere within the period separating the pulses. (The dither window is the period within which a monocycle can occur when position modulated by a dither code.) T1 904 and T2 910 can even use the same dither code because a time delay between them permits decorrelation. Typically, however, they would be operated on different time dither codes.

In this embodiment, T1 904 generates a blanking pulse that prevents receiving any energy within a certain amount of time after transmission, for example, 10 ns. This allows the antennas in the local environment to ring down or dampen energy for opening the receiver for possible received pulse. For example, a pulse width of 0.5 ns (or center frequency of 2 gigahertz), with a period of 200 ns (which is the repetition rate of 5 megapulses per second), produces a cycle of 1 in 400 (i.e., 0.25%).

A blanking pulse equalling the transmitted pulse emitted is, however, not entirely effective. There is still sufficient energy ringing down in the environment and in the antenna that may cause significant self-interference. Statistically, pulses can align themselves perfectly in only about 1 in 400 pulses. The blanking window of 10 ns increases the probability of a received pulse being within that blanking window, up to 1%. A 1% probability means that 1% of the energy is thrown away by the receiver. A loss of only 1% of transmitted energy is a very small penalty to exact to allow for a full duplex operation. This 1% reduction likely unmeasurable.

A still further embodiment is frequency division multiple access (FDMA), where the word "frequency" stands for pulse repetition frequency, which distinguishes this term from that used in continuous wave FM systems.

Figure 15:
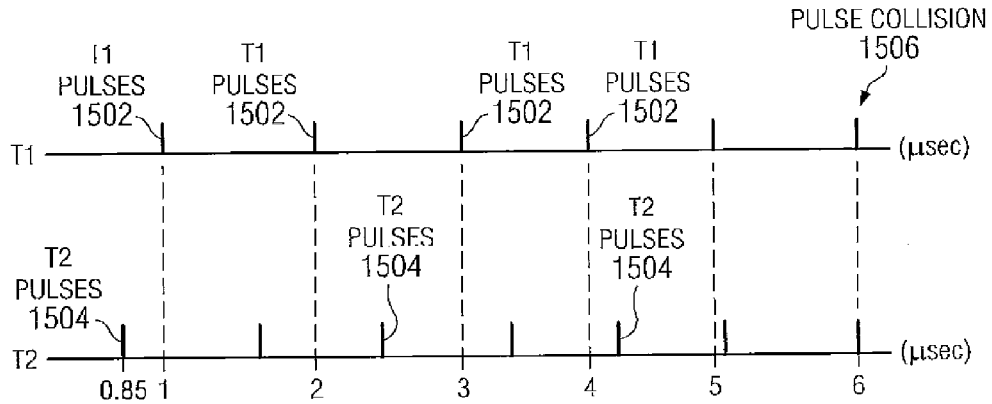
FIG. 15 shows exemplary pulses for a further embodiment of the present invention using different pulse repetition frequencies for two communicating transceivers.

FIG. 15 shows exemplary pulses for this embodiment, in which T1 904 is operated for example, at 1 megapulse per second (represented by microsecond pulses 1502 (numbers 1, 2, 3, 4, 5, 6 and so on). Assuming T2 910 is operating on, about 0.85 microseconds per period (see pulses 1504), after six pulses the two will come into alignment and be approximately settled. But after that time, however, all of the pulses miss.

Therefore, if the timed coding is confined to a relatively narrow window (say 4 ns, which is used for a 2 gigahertz center frequency system) then no matter what the placement of the two transceivers relative to each other, only one in six pulses will collide with each other. In practice, the repetition rate difference between the two would be such that only one in a hundred would cause a collision 1506. That one in a hundred can be blanked out (similar to the preceding example), which would again cause a 1% in reduction in power available to the receiver.

Blanking can be implemented in many ways. Discrete logic can be used to determine when received pulses and transmitted pulses of two different pulse repetition rates will interfere or occur too close in time. Interference is avoided by gating off one of the trigger signals (for example).

This FDMA embodiment has some of the advantages of the pulse interleaving embodiment, such as 100% availability of the transmitter. The pulse interleaving embodiment requires the transmitter to be turned off for a significant fraction at the transmitting cycle. The disadvantage being, for the same average of transmitted power, the pulse power has to be that much higher to make up for it. The duty cycle in the first example was on the order of 33%. Therefore the pulse power (i.e., the instantaneous pulse power), would have to be 66% larger. This last embodiment shares the advantages of pulse interleave—100% availability of the carrier—but it is never turned off on transmit. On receiving however, the periodic self-interference is taken care of by blanking, as in the previous example, reducing the received power availability by only 1%, a perfectly acceptable number.

The method used to provide for isolation between a transmitter and a receiver for a full duplex impulse radio link is different than for conventional radios because conventional radios operate using continuous wave carrier frequencies. These carrier frequencies can be very narrow-band and as such, frequency domain techniques can be used to isolate the transmitter from the receiver in the same view. Low pass filters can be used on the transmitter to prevent spurious energy from getting into a receiver, which is operated at a slightly higher frequency. Conversely, a high pass filter is used to eliminate power from the transmitter from getting into the receiver. This conventional filtering, however, cannot effectively be applied to impulse radio systems because the transmitter and receiver use the same pulse with monocycle.

Figure 16:
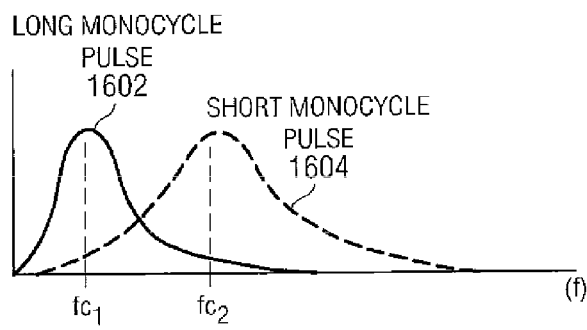
FIG. 16 illustrates the cross correlation process in accordance with the present invention.

The operating characteristics of an impulse radio system therefore require a different isolation/filtering approach. This can best be illustrated by way of example. Two monocycles pulses with different center frequencies are shown in FIG. 16. A long monocycle 1602 has a low frequency content, and a shorter monocycle 1604 has a higher center frequency. Although these two pulses differ in center frequency by nearly 3 to 1, they still significantly overlap. Therefore, even in this case a filter can be used to provide some isolation between a transmitter and a receiver, operating at one center frequency ($f_{c1}$) on the uplink and different center frequency ($f_{c2}$) on the downlink. In this embodiment contention is completely eliminated by the fact that different center frequencies are used in operation.

A. The Impact of the Width of the Dither Window on System Performance

As note above, the dither window is the period within which a monocycle can occur as positioned by a dither code. In the above examples, the dither window is 5 ns wide. Each dither window is separated by 200 ns. Thus, a subsequent monocycle can occur anywhere within the next dither window, and at a minimum, 200 ns later. The concentration of pulses in a relatively narrow time zone in each frame, where a frame is the nominal interpulse interval, contributes to increased interference with conventional services, as well as increased interference with like transceivers. The increased interference is an undesirable consequence of the difficulty of making wider dither windows.

The difficulty lies in the fact that long time delays are difficult to make with low jitter. Because this is a coherent communication scheme, low jitter is important for efficient conversion of a pulse and for good signal-to-noise ratio at low RF power levels.

The pulse interleave method, burst interleave method, and the pulse repetition rate multiple access techniques are all three consequences of this concentration of energy in a small time zone. As this window is widened, the constraints are less on the system until at a limit, a whole frame can be a target for a gain given monocycle (i.e., in a 200 ns average pulse rate, a pulse can appear anywhere within that 200 ns). For generality sake, a brief off-time between dither windows is desirable.

In the pulse interleave, burst interleave, CDMA and the repetition rate multiple access techniques, the distinction between all these types of interleaves disappears at the full frame. They are indistinguishable from one another. This is because once the structure as removed by full frame dither, further shuffling cannot make it any more random. In addition, interleaving will not work when there are no quiet gaps.

IV. Exemplary Transceiver Hardware

A. Transmitter

Figure 17:
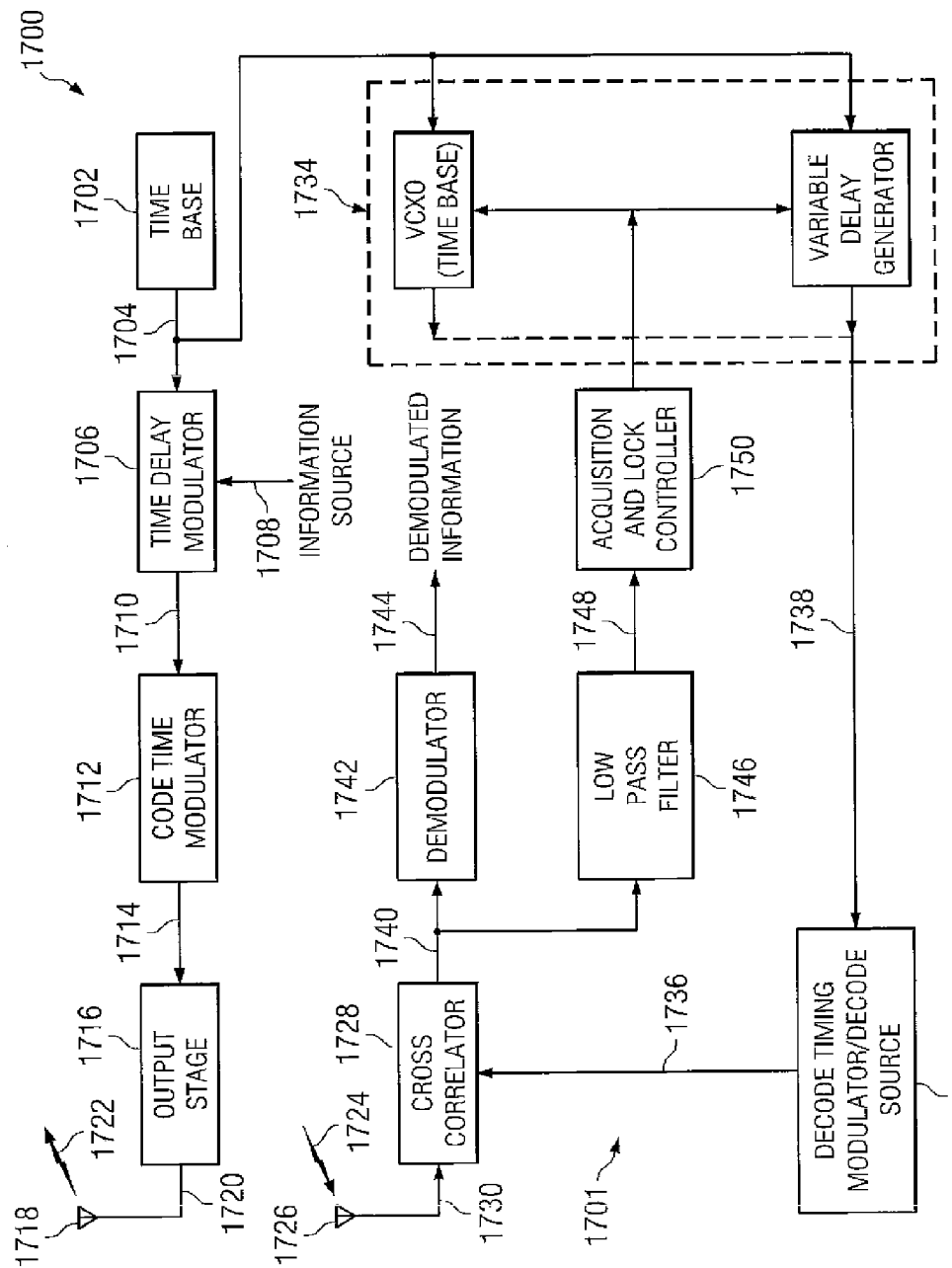
FIG. 17 shows a representative illustration of an impulse radio transceiver for full duplex communications, in accordance with an embodiment of the present invention.

A preferred embodiment of an impulse radio transmitter 904 or 910 of an impulse radio communication system will now be described with reference to FIG. 17.

The transmitter 1700 comprises a time base 1702 that generates a periodic timing signal 1704, which is provided to a time delay modulator 1706. The time delay modulator 1706 modulates the periodic timing signal 1704 with an information signal 1708 from an information source, to to generate a modulated timing signal 1710. The modulated timing signal 1710 is provided to a code time modulator 1712 that dithers the modulated timing signal 1710 using a pseudo noise code. The code time modulator 1712 outputs a modulated, coded timing signal 1714 to an output-stage 1716. The output stage 1716 uses the modulated, coded timing signal 1714 as a trigger to generate electrical monocycle pulses (not shown). The electrical monocycle pulses are sent to a transmit antenna 1718 via a transmission line 1720 coupled thereto. The electrical monocycle pulses are converted into propagating electromagnetic pulses 1722 by the transmit antenna 1718. A detailed description of various impulse radio transmitters is included in the '973 application.

B. Receiver

An impulse radio receiver 1701 will now described with reference to FIG. 17. An impulse radio receiver (hereafter called the receiver) 1701 comprises a receive antenna 1726 for receiving a propagated impulse radio signal 1724. A received signal is input to a cross correlator 1728 via a receiver transmission line 1730, coupled to the receive antenna 1726.

The receiver 1701 also comprises a decode timing modulator/decode source 1732 and an adjustable time base 1734. (The adjustable time base 1734 can comprise a voltage controlled oscillator or a variable delay generator, as would be apparent to a person skilled in the art.) The decode timing modulator/decode source 1732 (hereafter called the decode timing modulator) generates a decode signal 1736 corresponding to the PN code used by the associated impulse radio transmitter (not shown) that transmitted the propagated signal 1724. The adjustable time base 1734 generates a periodic timing signal 1738 that comprises a train of template signal pulses having waveforms substantially equivalent to each pulse of the received signal 1724.

The detection process performed by the cross correlator 1728 comprises a cross correlation operation of the received signal 1724 with the decode signal 1736. Integration over time of the cross correlation generates a baseband signal 1740. The baseband signal 1740 is demodulated by a demodulator 1742 to yield a demodulated information (signal) 1744. The demodulated information signal 1744 is substantially identical to the information signal of the transmitter that sent the received signal 1724.

The baseband signal 1740 is also input to a lowpass filter 1746. The lowpass filter 1746 generates an error signal 1748 for an acquisition and lock controller 1750 to provide minor phase adjustments to the adjustable time base 1734. A detailed description of an impulse radio receiver is included in the '973 application.

Figure 18:
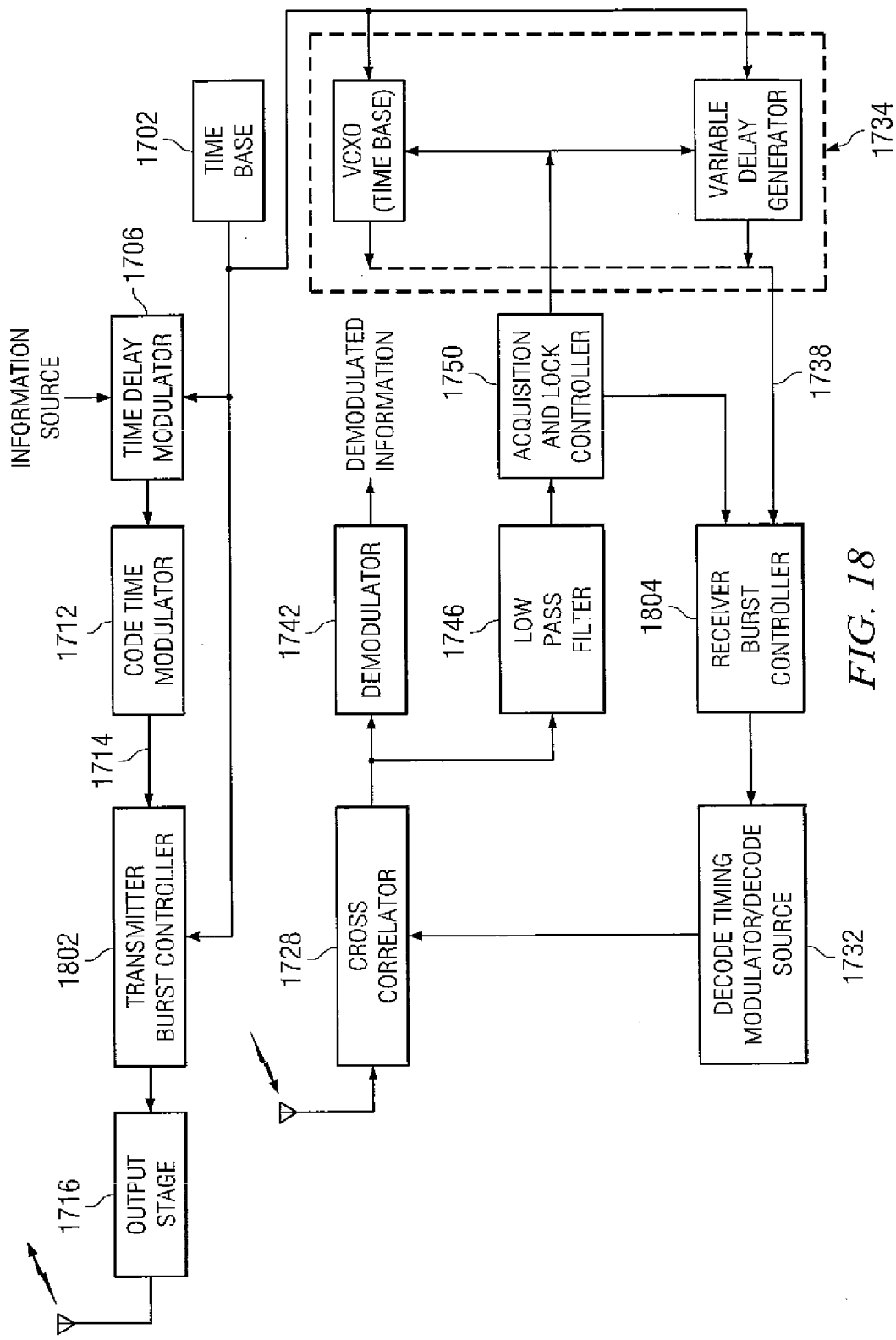
FIG. 18 shows a representative illustration of an impulse radio transceiver for full duplex communications, in accordance with another embodiment of the present invention.

FIG. 18 is a transceiver block diagram for the burst interleave embodiment of the present invention. A transmitter burst controller 1802 and a receiver burst controller 1804 are added to the basic architecture of the transceiver of FIG. 17. These two controllers are state machines that can be hardwired or programmably controlled (using EEPROMS, or the like) to time position the modulated, coded timing signal 1714 and to time modulate the periodic timing signal 1738, respectively, in accordance with the burst interleave operation described above.

The delay required for the pulse interleave embodiment of the present invention is determined and provided by the acquisition and lock controller 1750. Similarly, for the other embodiments, the pulse repetition rate, dither window and are hardwired or programmably controlled into the burst controllers 1802, 1804 and the acquisition and lock controller 1750, for example. Other control features and modifications to the disclosed transceiver components/controllers would be apparent to a person skilled in the relevant art without departing from the scope of the present invention.

C. Time Hand-off

For the pulse interleave embodiment, each receiver must measure the time between the reception of a pulse from another transceiver and the trigger to its own transmitter (this which can be accomplished with conventional circuitry). When one transceiver detects that this time is below a minimum limit (e.g., 20 ns), it notifies the other transceiver to synchronously change its receive timing (and the first transceiver will change its transmit timing) at, for example, the first pulse of the second code modulo from now. Where "now" is a point in time determined by the first transceiver as a reference point in time that is communicated to the second transceiver (or otherwise inferred by the second transceiver) for synchronization.

This is possible because, although it is not possible to "tag" individual pulses using modulation (since many pulses make up a bit), modulos are long enough to encode at least one whole bit, and that therefore can serve as a trigger for the counting of whole modulos. Since the coder keeps track of the pulse "count" in order to apply the correct time dither to the decoder, this method can indirectly identify individual pulses for the purpose of synchronization.

This process will be repeated any time the minimum time separation is detected, which happens every 54.86 meters (180 feet) of travel at a 5 MPPS rate for example.

A mechanism to accomplish the synchronization and locking for operation of pulse interleave can be discrete logic, but can be readily implemented by a digital signal processor (DSP) with minimal programming that would be apparent to a person skilled in the relevant art based on this disclosure of the pulse interleave functionality.

Figure 19:
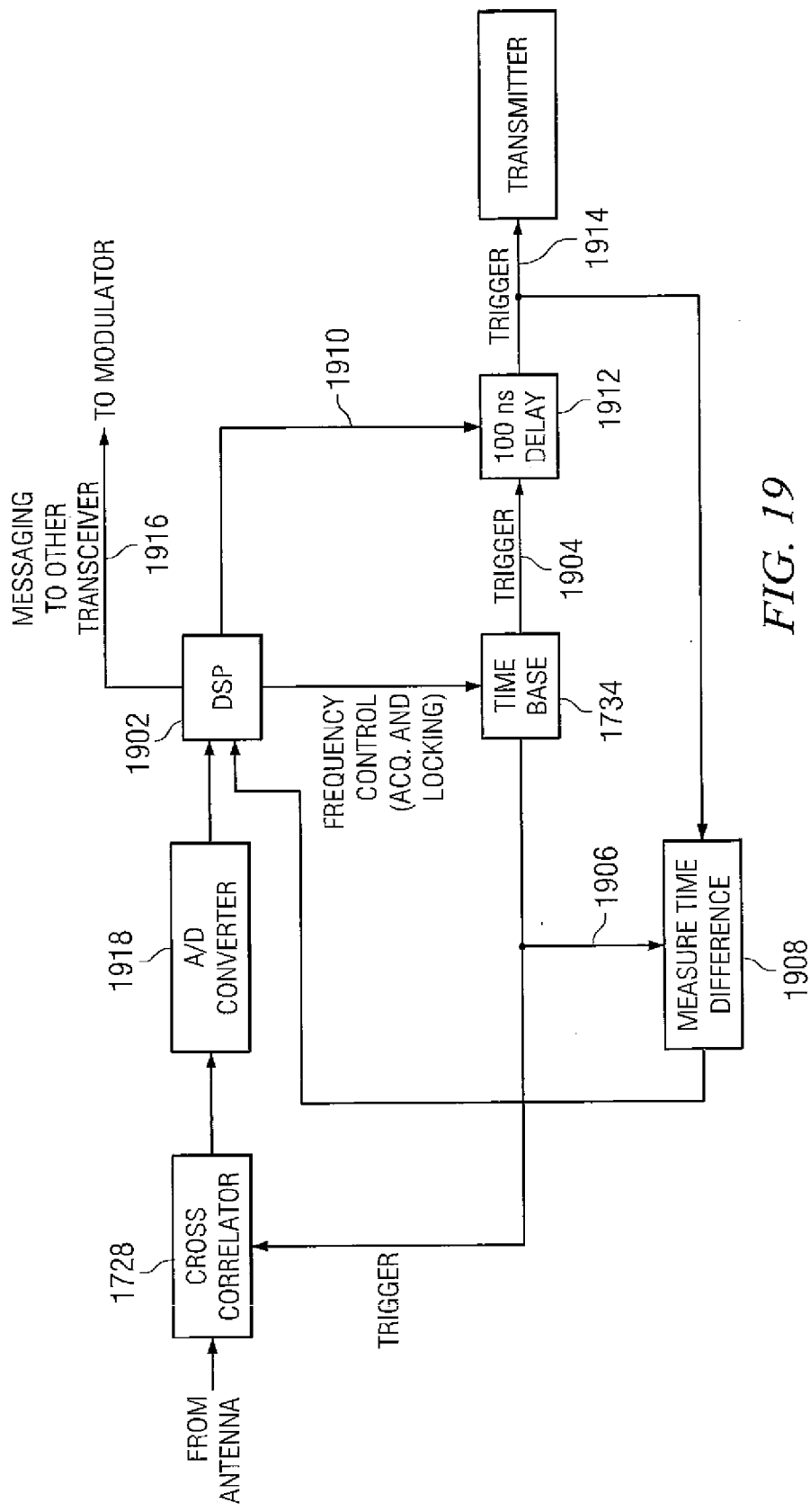
FIG. 19 shows an exemplary block diagram of a transceiver implemented for synchronizing pulse interleaving, according to a preferred embodiment of the present invention.

FIG. 19 shows an exemplary block diagram of a transceiver implemented using a DSP for synchronizing pulse interleaving, according to a preferred embodiment of the present invention. This figure shows enough detail of a transceiver to describe the synchronization. A DSP 1902 is used to determine whether the transmitter trigger signal 1904 is too close to the receiver trigger signal 1906, using a block 1908, labeled "measure time difference." The DSP 1902 delays the transmitter trigger signal 1904 by 100 ns (for example) by sending a delay control signal 1910 to a delay block 1912 to outputs a delayed trigger signal 1914, which is provided to the transmitter. The DSP 1902 also outputs massaging information 1916 to be modulated with the data to accomplish the synchronization with the other transceiver. A analog-to-digital (A/D) converter is shown at 1918, because the DSP need to process the cross correlator output in the digital domain.

Figure 20:
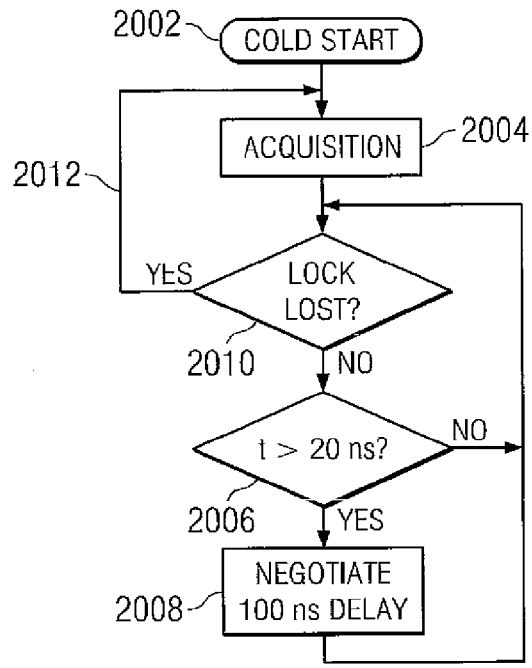
FIG. 20 shows a flow diagram to implement a delay for pulse interleaved communications.

FIG. 20 shows a flow diagram of the DSP operation to implement a delay for pulse interleaved communications. From a cold start 2002, the transceivers acquire lock 2004, as described above. If a time (t) between a transmitted pulse and a received pulse is less than 20 ns, as shown at a decisional block 2006, a 100 ns delay is negotiated between the two transceivers at 2008. This is termed a negotiation, since either transceiver can perform the necessary delay. The negotiation is carried out via massaging 1916. If lock is lost, as determined by decisional block 2010, acquisition must be repeated, as shown at 2012.

D. Differential Rate Duplex

In the pulse repetition rate embodiment, if the transmitter and receiver comprising a transceiver are operated at two different rates, then it is not possible to "interleave" the pulses, since they "beat" with each other (i.e., the timing of the pulse trains will periodically cause the transmitted and received pulses to periodically coincide).

A mechanism similar to the detector described above can be used to detect the minimum pulse separation condition. However, this signal will be employed in a different way: either to blank the trigger to the correlator correlator or to the transmitter. Either response will have the desired result of preventing self interference, but they have different tradeoffs in a communications system.

If the transmitter is blanked, it will reduce the transmitted power and interfere with the carrier which would be received by another transceiver, due to the gaps in the carrier which result from the blanking action. However, it increases the received power to the first transceiver, since it will not have to throw away the pulses which occur within this minimum separation window as would be the case if the receiver is blanked instead.

V. Other Considerations

The communications methods described here have been observed to be usable not only using radio (electromagnetic) impulsive waveforms, but also may use acoustic signals. The principle differences in the latter approach are: (1) frequency of operation and (2) signal transmission.

The frequency of operation is primarily between a few tens of Hertz (e.g., pulses of a duration of several tens of milliseconds), up to a few hundred Megahertz (e.g., pulses with durations of a few nanoseconds).

Acoustic transducers are employed in the acoustic approach rather than the antennas, which are used for the radio approach. The signal characteristics of the transducers are similar to the signal characteristics required by the antennas used in the radio approach in that they must be capable of transmitting and/or receiving waveforms with bandwidths of ☐ 100% of the center frequency (without more than a few percent dispersion, and with good conversion gain). Transducers may be made from a material called Kynar Film supplied by Pennwalt Corporation in Valley Forge, Pa. The geometry of a transducer made from this type as would become apparent to a person skilled in the relevant art.

IV. Fast Locking Mechanism for Channelized Ultrawideband Communications

Figure 21:
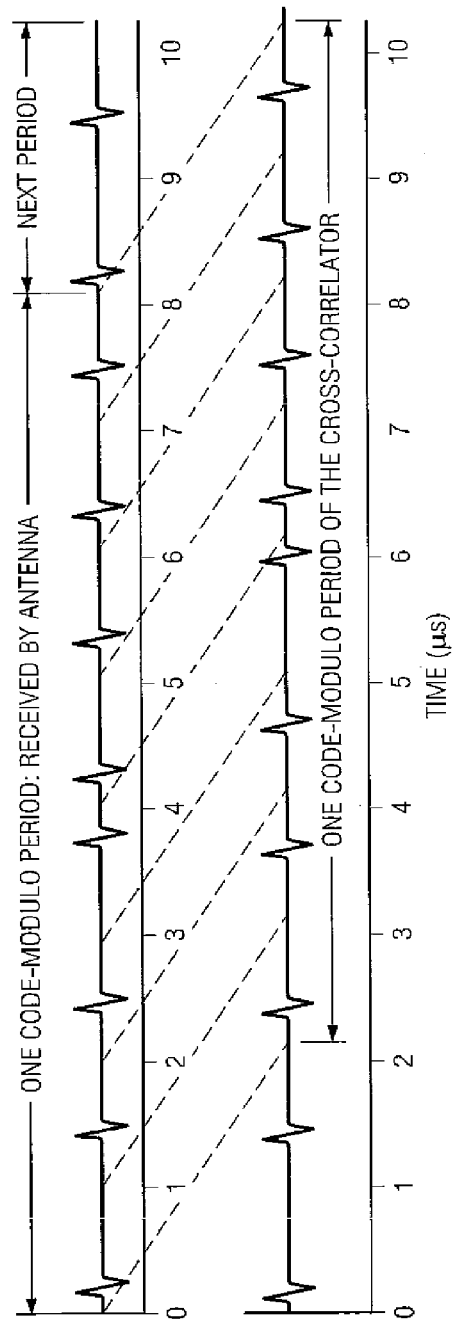
FIG. 21 illustrates acquisition using a conventional method of a sliding correlation.
Figure 22:
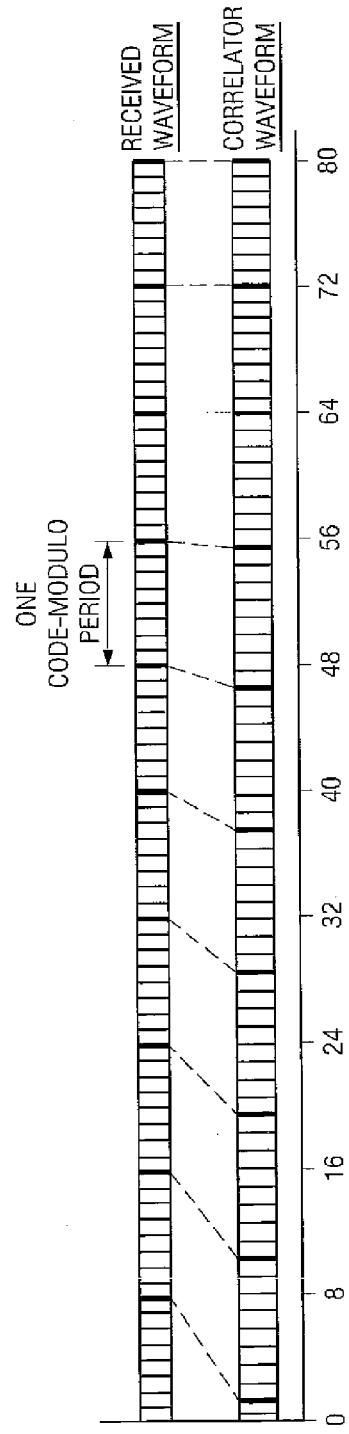
FIG. 22 shows misalignment of two time bases in accordance with the present invention.

FIG. 21 illustrates acquisition using a conventional method of a sliding correlation. This figure shows a short sequence of eight pulses (chips)/modulo with a chip frame period of 1 microsecond (μs). Here the receiver is shown out of synchronization with the received pulse train. As shown in this figure, the monocycle pulse may occur anywhere in the chip frame due to dithering. The time difference between the received waveform and the cross correlator are shown in FIG. 21 to differ by only about 2.2 μs. The time scales illustrated in this figure are greatly exaggerated. At the time scales shown, the monocycle pulses are sub-nanosecond waveforms and would be invisible. Furthermore, in reality, the chip modulo would be 256 or some higher power of 2. Further still, the chip modulo may be a non-repeating code, or the like. FIG. 22 shows misalignment of two time bases illustrated as blocks using a larger time scale than that shown in FIG. 21. Each block of eight units indicates the period of a code modulo (8 μs) and the smaller blocks are the chip frame time, within which a single, time coded monocycle pulse will occur. According to the present invention, the interpulse period of the correlator is initially set to be slightly different than that of the received waveform, which is shown at the left hand side of this figure to be longer. The receiver's correlator comes into alignment at approximately the 64 μs mark and thereafter maintains synchronization using feedback to adjust the correlator period to match that of the received waveform.

In the simple sliding lock technique of FIG. 21, the receiver's correlator PN time-hopping code progresses through its entire code modulo at a rate slightly faster than the corresponding code generator in a transmitter with which it is attempting to acquire a lock. This rate is determined by either the maximum offset frequency of an adjustable time base (typically a voltage control crystal oscillator or VCXO) or by the maximum rate of change of the frequency of the adjustable time base. Therefore, up to eight periods must be scanned past each other in order to find the desired desired alignment. For example, an impulse radio transmitter operating at 1 mega (M) pulses per second (pps) may be scanned by a receiver operating at a 20 ppm offset, which is a rate of 1/(20 Hz)=0.05 seconds per chip, where a chip is defined as 1 monocycle pulse. In other words, a link using a code modulo of 250 pulses will take 12.5 seconds to be scanned. However, if the center frequency of the monocycle is 2 GHz, the bandwidth of the correlation signal that would be presented to the error circuit for locking purposes will be 40 kHz. This is much too high a rate to control a typical VCXO, since such oscillators typically have a 1 kHz control bandwidth.

The present invention, however, allows a receiver to lock to a (received) time dither coded signal in a minimum possible time, more quickly than can be accomplished by a simple sliding correlation search as described in connection with FIG. 21. According to the present invention, the phase of the receiver adjustable time base is intentionally counted through its cycle with either an occasional duplicated or dropped chip. This has the effect of jumping the phase of the receivers code generator one whole chip (for example) with respect to the transmitter's code generator without the necessity of sliding the correlator pulse to the next received pulse phase. While this is being done, the adjustable time base is also allowed to run either slightly faster or slower than the repetition rate of the transmitter, thus allowing the receiver's cross correlator to slide across the time between two pulses of the received signal. With the proper settings in the receiver, all possible timing and code phases are examined during the drift from one pulse to the next.

The calculation of required dwell time of the receiver code phase is based on the amount of energy contained in the received pulse. Generally, it is simply the same as the number of pulses used by the receiver to assemble one bit, usually more than about 16 pulses, but in high noise environments this could require thousands of pulses. In this way, the signal-to-noise ratio of the noise acquisition process will be similar to that of the data recovery circuit in the receiver. According to a preferred embodiment, an address counter driving a read only memory (ROM) containing the code table, is allowed to count successive time code values for enough steps to allow that number of pulses to be integrated to determine whether the current phase (code phase) is the proper one. Then the counter is either incremented or decremented by one or more counts to slip the phase of the correlator. This process is repeated continuously until all phases are tested at the current time position (pulse phase) or until coincidence of the received signal in the template signal is detected. As noted above, an adjustable time base in the receiver is adjusted to allow the correlator to drift in pulse phase at the rate which allows all of the possible code phases to be tested at each of the possible pulse phases.

Figure 23:
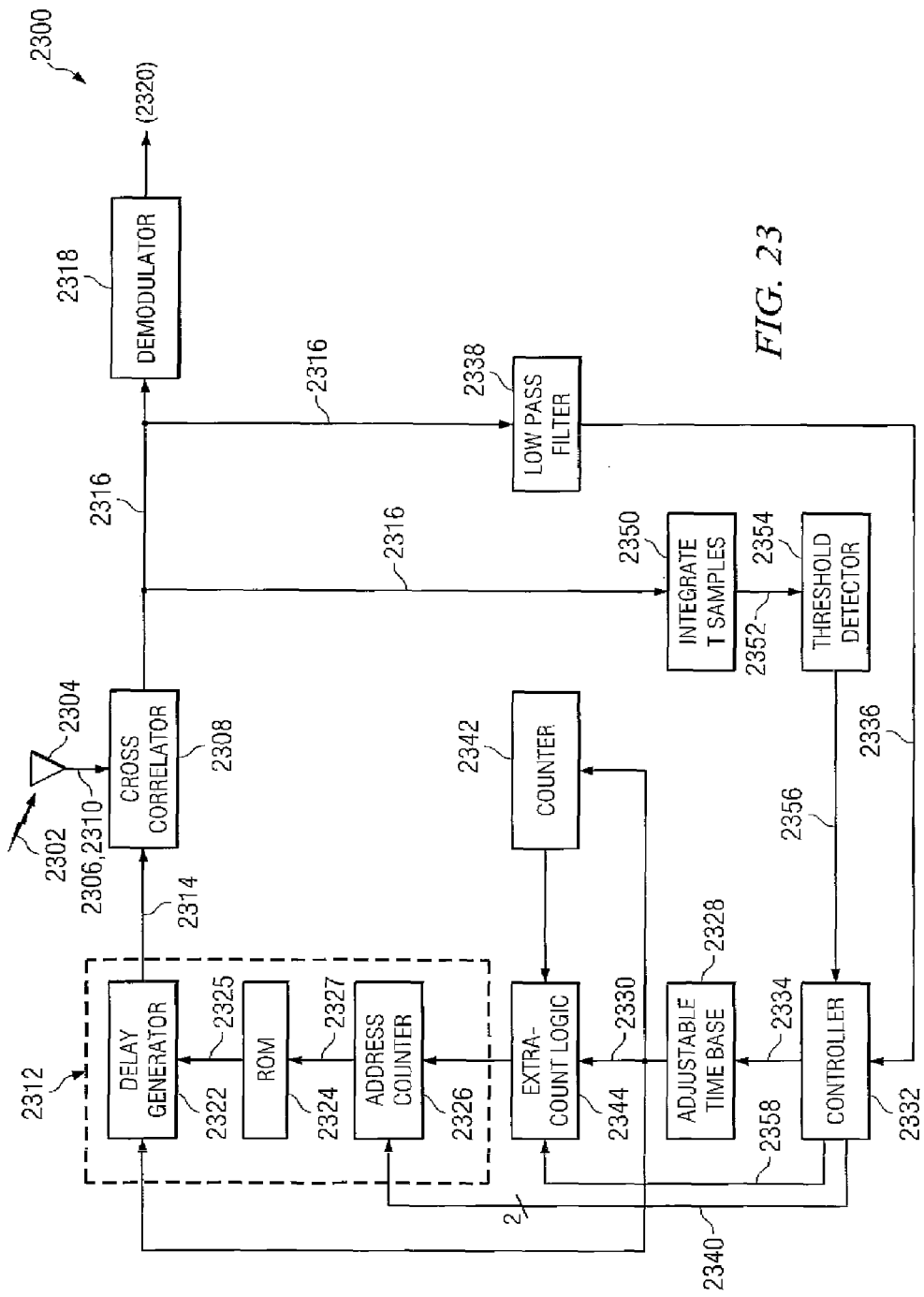
FIG. 23 shows a representative block diagram of an impulse radio receiver for fast lock, in accordance with the present invention.

A representative block diagram of an impulse radio receiver 2300 is shown in FIG. 23. Receiver 2300 receives impulse radio signals 2302 propagated through a propagation medium (not shown) at an antenna 2304. A received signal 2306 is input to a cross correlator 2308 via a receiver transmission line 2310 coupled to the antenna 2302. A decode timing modulator (dashed box) 2312 produces a decode signal 2314, which is provided to the cross correlator 2308. The cross correlator 2308 cross correlates the received signal 2306 with the decode signal 2314 and outputs a baseband signal 2316. Once signal acquisition and lock are made, as described below, the baseband signal 2316 is demodulated by a demodulator 2318, which outputs a demodulated information signal 2320.

The receiver 2300 also comprises an adjustable time base 2328. The adjustable time base 2328 generates a periodic timing signal 2330. A controller 2332 generates a rate control signal 2334 to control the rate of the periodic timing signal 2330. The controller 2332 receives an error signal 2336, which is a low pass filtered version of the baseband signal 2316, via a low pass filter 2338.

Decode timing modulator 2312 comprises a (binary-to-time) delay generator 2322, a PN code and linearization read only memory (ROM) 2324, and an address counter and limit logic block 2326. Start address and stop address signals are provided to the address counter and limit logic block 2326 from the controller 2332 via lines shown at 2340. Addresses are output from the address counter and limit logic block 2326 via a bus 2327. The address counter and limit logic block 2326 provides addresses to access the PN code and linearization ROM 2324 when triggered by the periodic timing signal 2330 provided by the adjustable time base 2328. A PN code (that corresponds to a known PN code used by an impulse radio transmitter) is output by the PN code and linearization ROM 2324 via a bus 2325 and is provided to the (binary-to-time) delay generator 2322. The (binary-to-time) delay generator 2322 time modulates the periodic timing signal 2330 to generate the decode signal 2314.

Further details of delay generator 2322, read only memory (ROM) 2324 and address counter 2326 of the decode timing modulator 2312, as well as the operation of the cross correlator 2308 and demodulator 2318 are fully described in U.S. Pat. No. 5,677,927 and Ser. No. 08/428,489 application, now U.S. Pat. No. 5,687,169, both of which are fully incorporated by reference herein. For example, the adjustable time base 2328 can comprise a programmable divider (not shown) and a voltage controlled oscillator (VCO) (not shown), which are used to output the periodic timing signal 2330. A voltage control signal is provided to the VCO from the controller 2332 to adjust the VCO output, as will be apparent to a person skilled in the relevant art.

The cross correlator output is a wide band baseband signal (2316), which is on the order of half the pulse repetition rate. For example, a 5 Mpps rate would yield a 2.5 MHz wide baseband signal (0-2.5 MHz). The section of that bandwidth that is of interest to the lock loop is in the kilo hertz range and below. Therefore, the low pass filter 2338 cuts off frequencies above about 10 kHz, unless a high speed lock process (i.e., acquisition scheme) is employed, in which case 100 kHz may be the cutoff. Assuming that the controller 2332 is a microprocessor or a digital signal processor (DSP), such as a TMS320C40 DSP (manufactured by Texas Instruments, Dallas, Tex.), or the like, the high frequency does not affect the VCO (not shown) directly, and is easily handled by the DSP, which in turn controls the VCO.

Figure 24:
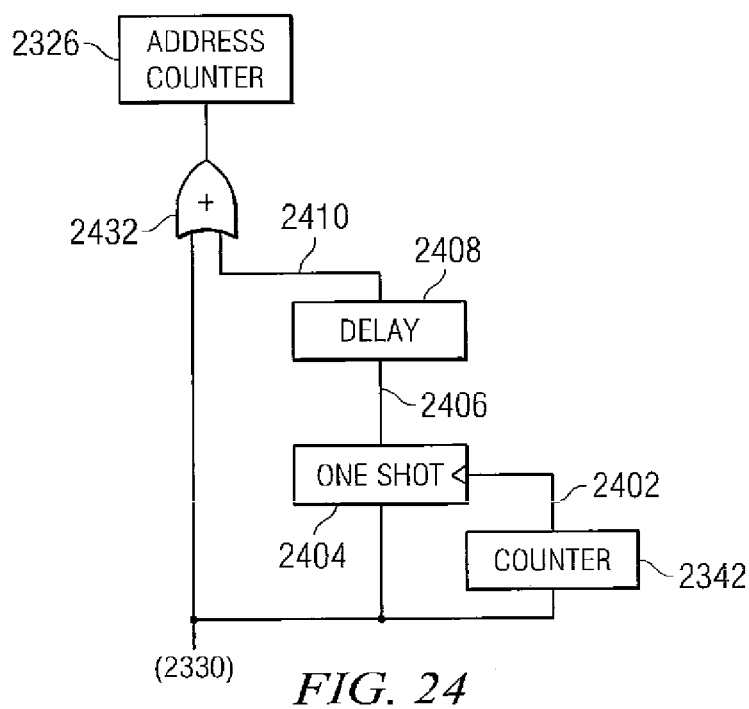
FIG. 24 shows an exemplary block diagram for the extra-count logic of the receiver in FIG. 23.

Additional logic for acquisition and fast lock of impulse signals includes a counter 2342 that determines whether or not T chips have been integrated using the current code phase. If so, an extra count is added using discrete, extra-count logic 2344. Exemplary logic is shown in FIG. 24. In this example, counter 2342 is a 16-chip counter that produces an output every T (16 for example) chips of the code modulo. The output 2402 of the counter enables a one shot monostable timer 2404. The inputs of the counter 2342 and the monostable timer 2404 are triggered by the periodic timing signal 2330. An output 2406 of the monostable timer 2404 must be delayed by a delay element 2408 to avoid overlapping of its output 2410 (called the "extra count") with the periodic timing signal 2330. The extra count output of the delay element is ANDed (via a gate 2412) with the periodic timing signal 2330 and input to the address counter 2326.

Lock is detected via integration of T samples (see block 2350) and comparison of a integration result 2352 via a threshold detector 2354. The threshold detector 2354 outputs a channel coincidence signal 2356 to the controller 2332. Once coincidence is detected, the controller 2332 disables the extra-count logic via a stop extra-count signal 2358, thus implying signal lock.

VII. Fast Locking Analysis and Operation

Figure 25:
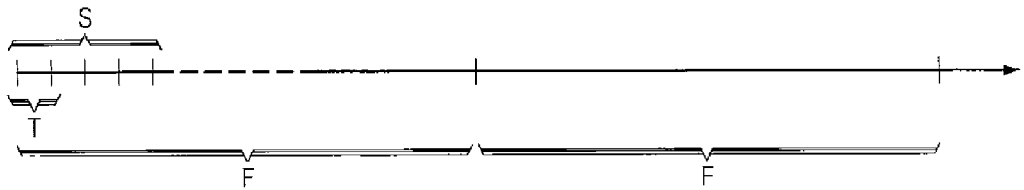
FIG. 25 illustrates pulse width tau ($\tau$) and frame (F) length of a monocycle pulse.

FIG. 25 illustrates pulse width τ (tau) and frame length (F) (i.e., the pulse-to-pulse interval) of a monocycle pulse (not shown). For explanation and analysis of acquisition and fast locking according to the present invention, the pulse width τ is subdivided into s sampling windows (4 sampling windows are shown in the figure). A trial number (T) represents the number of pulses integrated by the integrator 2350 per sampling window, prior to shifting the code count via the extra-count logic 2344. The code's modulo length is M, which for this analysis M=256.

Given a center frequency of 2 GHz, the monocycle pulse width τ is $0.5 \times 10^{-9}$ sec. for this example, and the frame width is $1 \times 10^{-6}$ sec. The total number of samples per frame is thus:

$$F_s = \frac{F \cdot s}{\tau}$$

Using the above exemplary values, $F_s$=8000 samples. The worst case number of pulses to acquire code phase coincidence to result in a signal lock is:

$$F_T = F_S \cdot T \cdot M$$

Which, using the above exemplary values, $F_T = 3.3 \times 10^7$ pulses. Finally, the worst case time period to acquire code phase coincidence is:

$$t_1 = F_T \cdot F$$

Which, using the above exemplary values, $t_1$=32.8 sec. Modifications in operation and/or hardware can be made to the lock mechanism to greatly reduce this seemingly high value.

For example, the cross correlation rate can be sped-up by one or two orders of magnitude. This will, however, increase the cost of the cross correlator. Alternatively, a plurality of less expensive cross correlators can be used in parallel. Each cross correlator in this case would correlate a different section of the code, and the cross correlated results would need to be separately integrated for threshold detection.

Figure 26:
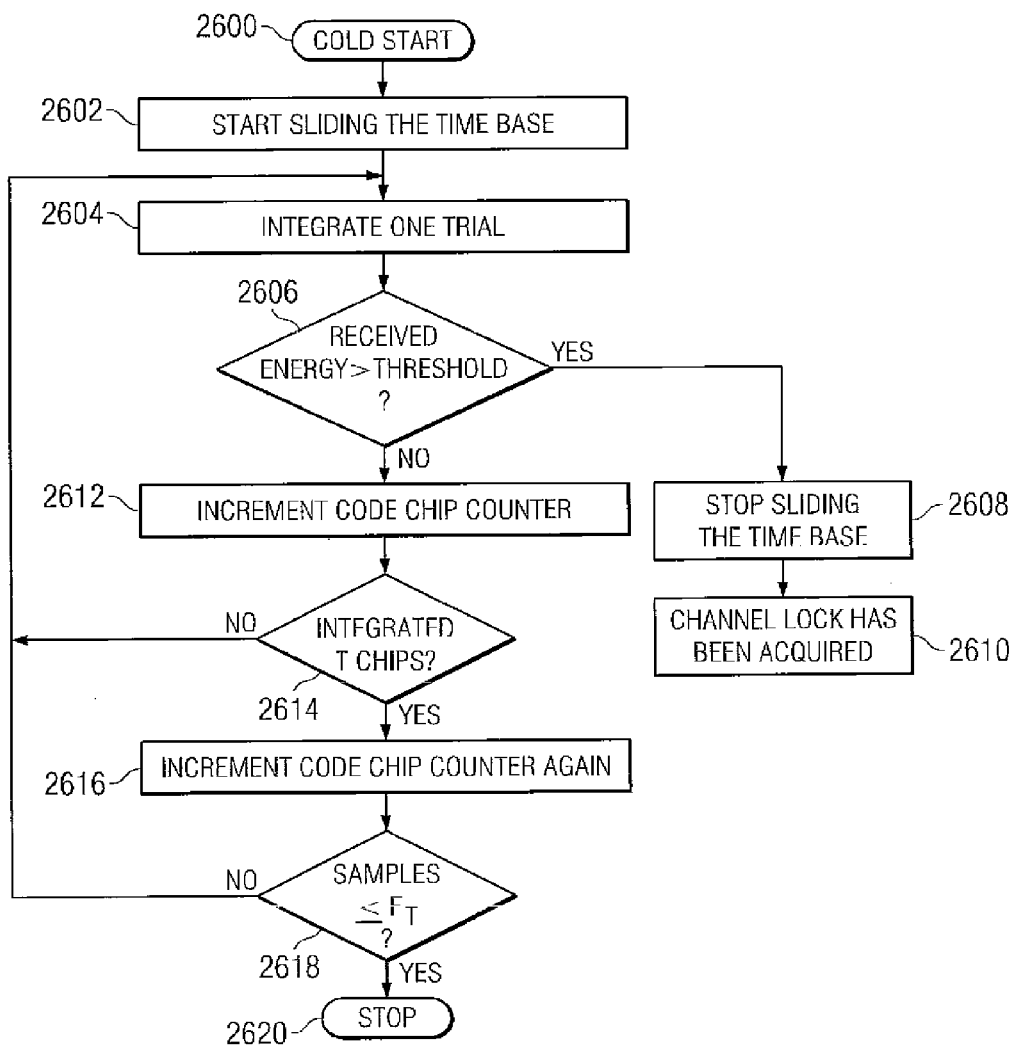
FIG. 26 shows a flow diagram illustrating operation of signal acquisition and lock according to the present invention.

FIG. 26 shows a flow diagram illustrating operation of signal acquisition and lock according to the invention. From a cold start 2600, the receiver's controller 2332 starts sliding the rate of the adjustable time base, as shown at 2602. One trial worth of correlation results are integrated, at a step 2604, and received energy is compared to the threshold, at a step 2606. If coincidence is detected (see "Yes" result of conditional statement 2606) the controller stops sliding the time base (at 2608) to maintain signal lock (at 2610). If the threshold is not exceeded (see "No" result of conditional statement 2606), the address counter is incremented, as a step 2612.

The counter 2342 then determines whether T chips have sampled, at a conditional step 2614. If so, the extra-count logic in enabled and the address counter is incremented an extra code chip, as shown at step 2616. If T chips have not yet been sampled, no extra count is added, and the process returns to step 2604. A conditional step 2618 determines whether all $F_T$ pulses have been sampled. If so the acquisition process is stopped, at step 2620, assuming there is no impulse signal to detect; otherwise, processing continues to step 2604.

In alternative embodiments, the step 2616 need not be a single chip increment. The count can be incremented or decremented by one or more chips, or can be a random ordering so as to avoid repeating samples or missing any one sample in the modulo altogether. In fact, the modification of the chip count can be done according to an algorithm programmed into the controller or the counter. Such programming would be apparent to a person skilled in the relevant art.

VIII. CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for acquisition and lock of an ultra wideband signal, comprising the steps of:
    sliding a periodic timing signal using an adjustable time base;
    producing a decode signal using said periodic timing signal, wherein successive decode signals are coded by successive chips of a code having a predetermined modulo length;
    cross correlating a received ultra wideband signal with said decode signal to output a baseband signal;
    integrating T samples of said baseband signal to output an integration result, where T is an integer;
    outputting a channel coincidence signal based on a threshold value and said integration result;
    determining whether channel coincidence has occurred using said channel coincidence signal, and
    if channel coincidence is detected, stopping said periodic timing signal from sliding, otherwise,
    if channel coincidence was not detected, adjusting said periodic timing signal and repeating the steps of sliding, producing, cross correlating, integrating and determining for successive T pulses of said periodic timing signal until-channel coincidence is detected.

2. The method according to claim 1, further including the step of stopping acquisition if the entire modulo length is completed before channel coincidence is detected.

3. The method according to claim 1, further including the steps of:
    producing plural decode signals; and
    cross correlating received ultra wideband signals with said plural decode signals using a plurality of cross correlators to reduce the time to acquire channel lock.

4. The method according to claim 1, wherein said decode signal is produced by a decode timing modulator having an address counter, and said adjusting step comprises counting T pulses of said periodic timing signal and incrementing or decrementing the address counter by a one or more extra counts after each T pulses is reached.

5. The method according to claim 1, further including the step of demodulating said baseband signal to output a demodulated information signal.

6. The method according to claim 5, wherein said demodulating step comprises a step of frequency demodulating said baseband signal to output a demodulated information signal.

7. The method according to claim 5, wherein said demodulating step comprises a step of direct digitally demodulating said baseband signal to output a demodulated information signal.

* * * * *